US011669995B2

(12) United States Patent
Filip

(10) Patent No.: US 11,669,995 B2
(45) Date of Patent: Jun. 6, 2023

(54) ORIENTATION DETERMINATION FOR MOBILE COMPUTING DEVICES

(71) Applicant: Google LLC, Mountain View, CA (US)

(72) Inventor: Daniel Joseph Filip, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/764,751

(22) PCT Filed: Dec. 26, 2019

(86) PCT No.: PCT/US2019/068563
§ 371 (c)(1),
(2) Date: May 15, 2020

(87) PCT Pub. No.: WO2021/133395
PCT Pub. Date: Jul. 1, 2021

(65) Prior Publication Data
US 2022/0319039 A1 Oct. 6, 2022

(51) Int. Cl.
G06V 10/82 (2022.01)
G06T 7/73 (2017.01)
(Continued)

(52) U.S. Cl.
CPC ............ G06T 7/73 (2017.01); G06V 10/12 (2022.01); G06V 10/24 (2022.01); G06V 10/60 (2022.01);
(Continued)

(58) Field of Classification Search
CPC . G06T 2207/20081; G06T 2207/20084; G06T 2207/30244; G06T 2207/30252;
(Continued)

(56) References Cited

U.S. PATENT DOCUMENTS 9,558,411 B1 * 1/2017 Ferguson ............. G06V 10/751
10,816,992 B2 * 10/2020 Chen ........................ G06T 7/75
(Continued)

FOREIGN PATENT DOCUMENTS

WO WO 2019/172941 9/2019

OTHER PUBLICATIONS

International Search Report and Written Opinion for Application No. PCT/US2019/068563, dated Sep. 25, 2020, 14 pages.
(Continued)

Primary Examiner — Ian L Lemieux
(74) Attorney, Agent, or Firm — Dority & Manning, P.A.

(57) ABSTRACT

Methods, systems, devices, and tangible non-transitory computer readable media for determining orientation are provided. The disclosed technology can include capturing images of an environment visible in a field of view of the mobile computing device. Location data associated with a location of the mobile computing device can be received. Image data including information associated with the images can be generated. Based on the image data and one or more machine-learned models, features of one or more objects in the environment can be determined. Based on the location data and the features of the objects, respective orientations of the objects relative to the location of the mobile computing device can be determined. Furthermore, orientation data that includes a geographic orientation of the mobile computing device can be generated based on the respective (geographic) orientations of the objects.

20 Claims, 9 Drawing Sheets

(51) Int. Cl.
*G06V 10/12* (2022.01)
*G06V 10/60* (2022.01)
*G06V 10/24* (2022.01)
*G06V 20/50* (2022.01)

(52) U.S. Cl.
CPC .............. *G06V 10/82* (2022.01); *G06V 20/50* (2022.01); *G06T 2207/20081* (2013.01); *G06T 2207/20084* (2013.01); *G06T 2207/30244* (2013.01); *G06T 2207/30252* (2013.01); *G06V 2201/07* (2022.01); *G06V 2201/08* (2022.01)

(58) Field of Classification Search
CPC ......... G06T 7/73; G06F 16/29; G06N 3/0454; G06N 3/084; G06V 10/12; G06V 10/60; G06V 10/24; G06V 10/82; G06V 20/50; G06V 2201/07; G06V 2201/08; G06K 9/6256; G06K 9/6267
See application file for complete search history.

(56) References Cited

U.S. PATENT DOCUMENTS

| | | | |
|---|---|---|---|
| 10,837,788 B1* | 11/2020 | Kentley-Klay | G01C 21/3438 |
| 11,030,766 B2* | 6/2021 | Choi | G06V 10/82 |
| 2019/0051056 A1* | 2/2019 | Chiu | G06N 3/08 |
| 2019/0079526 A1 | 3/2019 | Vallespi-Gonzalez et al. | |
| 2020/0160070 A1* | 5/2020 | Sholingar | G06N 3/0445 |
| 2020/0340817 A1* | 10/2020 | Schomerus | B60Q 1/50 |
| 2021/0041259 A1* | 2/2021 | Filip | G06T 7/70 |
| 2021/0042542 A1* | 2/2021 | Littman | G06T 7/97 |
| 2021/0216798 A1* | 7/2021 | Littman | G06V 10/82 |

OTHER PUBLICATIONS

Meyer et al. "Deep Semantic Lane Segmentation for Mapless Driving", 2018 IEEE/RSJ International Conference on Intelligent Robots and Systems, Oct. 1-5, 2018, Madrid, Spain, pp. 869-875.

* cited by examiner

ORIENTATION DETERMINATION FOR MOBILE COMPUTING DEVICES

PRIORITY CLAIM

This application is based upon and claims the right of priority under 35 U.S.C. § 371 to International Application No. PCT/US2019/068563 filed on Dec. 26, 2019, which is incorporated by reference herein.

FIELD

The present disclosure relates generally to navigation and in particular to systems, devices, and methods for determining orientation including the orientation of a computing device.

BACKGROUND

Operations associated with the state of a geographic area can be implemented on a variety of computing devices. These operations can include processing data associated with the geographic area for later access and use by a user or computing system. Further, the operations can include exchanging data with remote computing systems. However, the types of operations that are performed and the way in which the operations are performed can vary over time, as can the underlying hardware that implements the operations. Accordingly, there are different ways to leverage computing resources associated with the state of a geographic area.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of navigation and orientation determination. The computer-implemented method can include capturing, by a mobile computing device including one or more processors, one or more images of an environment visible in a field of view of the mobile computing device. Further, the computer-implemented method can include receiving, by the mobile computing device, location data associated with a location of the mobile computing device. The computer-implemented method can include generating, by the mobile computing device, image data including information associated with the one or more images. The computer-implemented method can also include determining, by the mobile computing device, based at least in part on the image data and one or more machine-learned models, one or more object classifications of one or more objects in the environment. The computer-implemented method can include determining, by the mobile computing device, based at least in part on the location data and the one or more object classifications of the one or more objects, one or more respective orientations of the one or more objects relative to the location of the mobile computing device. Furthermore, the computer-implemented method can include generating, by the mobile computing device, orientation data including a geographic orientation of the mobile computing device based at least in part on the one or more respective orientations of the one or more objects.

Another example aspect of the present disclosure is directed to one or more tangible non-transitory computer-readable media storing computer-readable instructions that when executed by one or more processors cause the one or more processors to perform operations. The operations can include capturing one or more images of an environment visible in a field of view of a mobile computing device. Further, the operations can include receiving location data associated with a location of the mobile computing device. The operations can include generating image data including information associated with the one or more images. The operations can also include determining, based at least in part on the image data and one or more machine-learned models, one or more object classifications of one or more objects in the environment. The operations can include determining, based at least in part on the location data and the one or more object classifications of the one or more objects, one or more respective orientations of the one or more objects relative to the location of the mobile computing device. Furthermore, the operations can include generating orientation data including a geographic orientation of the mobile computing device based at least in part on the one or more respective orientations of the one or more objects.

Another example aspect of the present disclosure is directed to a computing system that can include: one or more processors; and one or more tangible non-transitory computer-readable media storing instructions that when executed by the one or more processors cause the one or more processors to perform operations. The operations can include capturing one or more images of an environment visible in a field of view of a mobile computing device. Further, the operations can include receiving location data associated with a location of the mobile computing device. The operations can include generating image data including information associated with the one or more images. The operations can also include determining, based at least in part on the image data and one or more machine-learned models, one or more object classifications of one or more objects in the environment. The operations can include determining, based at least in part on the location data and the one or more object classifications of the one or more objects, one or more respective orientations of the one or more objects relative to the location of the mobile computing device. Furthermore, the operations can include generating orientation data including a geographic orientation of the mobile computing device based at least in part on the one or more respective orientations of the one or more objects.

Other example aspects of the present disclosure are directed to other methods, systems, devices, apparatuses, or tangible non-transitory computer-readable media for navigation and the determination of orientation. Moreover, it will be understood that any features described in regard to one example aspect can also be implemented as part of another example aspect.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
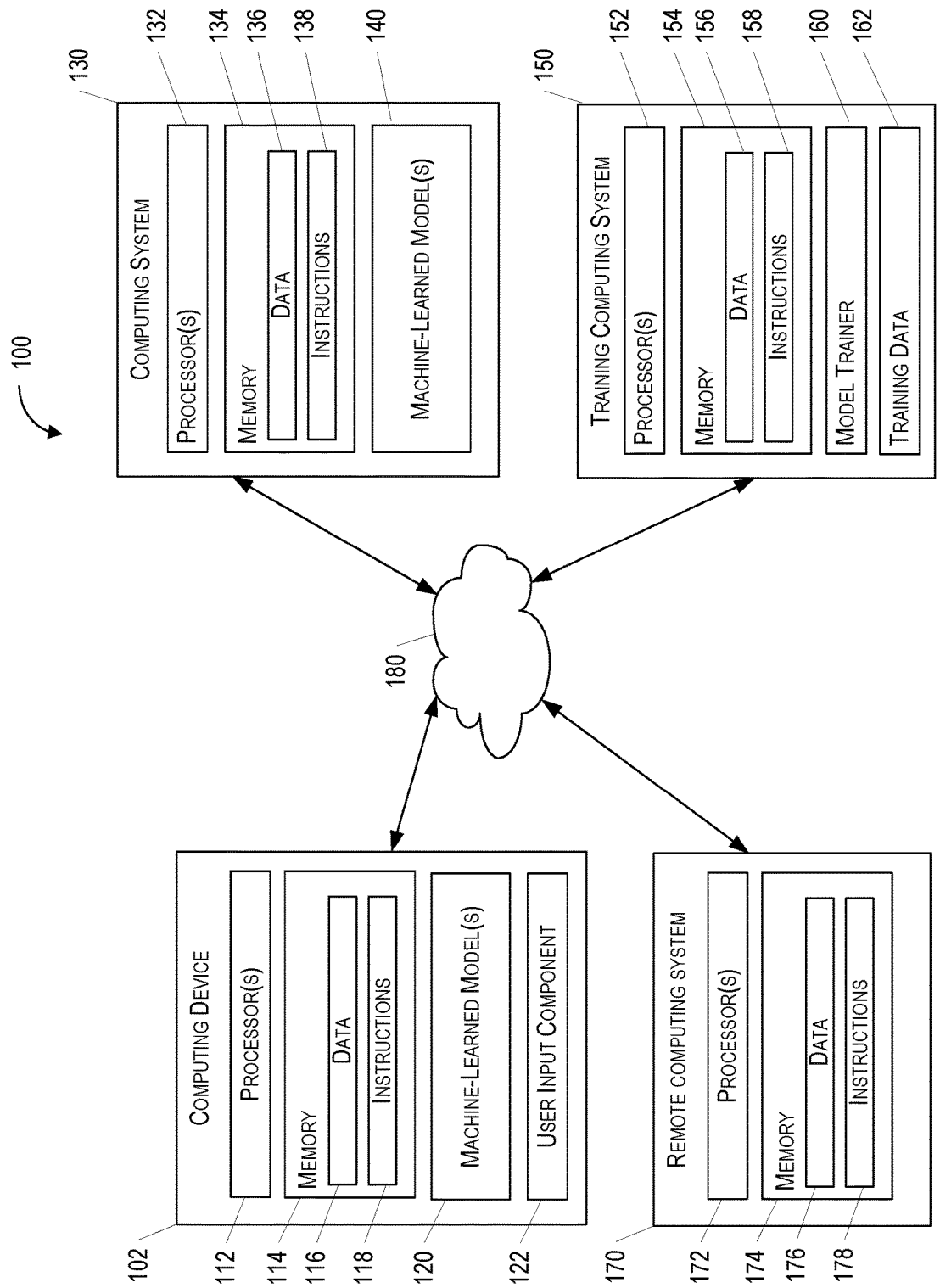
FIG. 1 depicts a diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a device that can be used to determine the orientation of one or more objects in an environment surrounding the device. Further, the disclosed technology can be used to determine the orientation of a device through use of a combination of location data associated with the general location of the device, image data associated with the appearance of the environment surrounding the device, and at least one machine-learned model that can be trained to determine the features of objects in the environment around the device.

In particular, the disclosed technology can determine a general location (the approximate geographic location) of the device using signals from a navigation satellite (e.g., a Global Positioning System ("GPS") satellite). By accessing additional data associated with characteristics of the location (e.g., the street on which the device is located), the approximate location of the device (or location data) can be used to determine whether the street is a one-way street or a two-way street. Further, the device can capture an image of the street and/or environment. Image data for the captured image can be provided as input to a machine-learned model that can use the captured image to generate an output including the direction in which objects in the image (e.g., parked vehicles) are facing. Using the information including whether the street is one-way or two-way, and the orientation of the objects in the image, the device can determine an orientation of the device relative to at least one of the objects. The geographic orientation of the device can then be determined based on the relative orientation of the objects with respect to the device. As such, the disclosed technology can provide a user with a reasonably accurate estimate of their orientation, allowing for more effective navigation through an environment. This approach can be of particular benefit in urban areas, where GPS location systems are less accurate due to the interfering effect of buildings but there are many objects within the environment. Further, the disclosed technology can provide additional benefits including a reduction in the amount of time and energy required to travel from place to place by providing improved location services.

The disclosed technology can be implemented by a computing device (e.g., a mobile computing device) and/or computing system (e.g., an orientation computing system) that is configured to access data, perform operations on the data (e.g., determine orientation of a device with respect to nearby objects), and generate output including the orientation of the computing device. Further, the computing system can be included in the mobile computing device and/or as part of a system that includes a navigation server that receives and/or sends location data (e.g., a current location of the mobile device) and/or image data (e.g., information and/or data associated with one or more images of the environment around the mobile device) from a client device (e.g., a mobile device which can include a smart phone); performs operations based on the received data; and generates and/or sends output including an orientation of the device back to the client device, which can be configured to perform further operations using the determined orientation.

By way of further example, the disclosed technology can use one or more cameras of a mobile computing device to capture one or more images of an environment visible in a field of view of the mobile computing device. The mobile computing device can then receive location data associated with a location of the mobile computing device (e.g., a latitude, longitude, and/or altitude that can be associated with a street address). Further, image data including information associated with the one or more images can be generated. The one or more images can, for example, include depictions of objects in the environment and can be formatted for use as an input to a machine-learned model. One or more machine-learned models (e.g., machine-learned models trained to detect, identify, and/or recognize visual features in images) can then receive an input including the image data and use the input to generate an output including one or more object classifications of one or more objects in the environment depicted in the image data. Further, based at least in part on the location data and/or the one or more object classifications of the one or more objects, the mobile computing device can determine one or more respective orientations of the one or more objects relative to the location of the mobile computing device. Orientation data that includes a geographic orientation of the mobile computing device can then be generated based at least in part on the one or more respective (geographic) orientations of the one or more objects. The geographic orientation can, for example, include bearings and/or be associated with the points of a compass (e.g., cardinal directions (north, south, east, west), intercardinal directions (north-east, southeast, southeast, southwest), and/or secondary intercardinal directions). Furthermore, the orientation data can be included as part of other data that can be used by other devices and/or systems including vehicle systems.

Accordingly, the disclosed technology can improve determination of orientation and location in an (urban) environment and thereby increase navigational efficiency and safety by providing a user with a more accurate indication of their orientation. Further, the disclosed technology can assist a user in more effectively performing the technical task of using a device's orientation to facilitate navigation from one location to another by means of a continued and/or guided human-machine interaction process.

A computing device (e.g., a mobile computing device) can capture one or more images of an environment visible in a field of view of the mobile computing device. For example, the mobile computing device can include one or more cameras with one or more respective fields of view. Each of the one or cameras can be used to capture one or more images (e.g., color images) of an environment in which the camera is present. Further, in some embodiments, the mobile computing device can be a handheld device (e.g., a smartphone) that can be pointed and/or aimed in a direction for which an orientation will be determined.

In some embodiments, the mobile computing device can include one or more image capture devices. For example, the mobile computing device can include one or more cameras that can be used to capture the one or more images of the environment. The image capture device can include various types of cameras that have different focal lengths, different sensor types (e.g., sensors configured to capture visible light and/or infrared light), and/or different apertures. Furthermore, the mobile computing device can include other types of sensors that can be used to determine the location and/or orientation of the mobile computing device including radar, sonar, and/or other passive and/or active sensor systems.

The mobile computing device can receive location data associated with a location of the mobile computing device. In some embodiments, the location data can be based at least in part on or include output from a satellite navigation system and/or output from one or more wireless communications network devices. For example, the mobile computing device can receive location data based at least in part on one or more signals from a GPS and/or GLONASS satellite. The location data can include information associated with the latitude, longitude, and/or altitude of the mobile computing device. Further, the location data can be based at least in part on data and/or information from a computing system that can provide further information associated with the location of the mobile computing device. The information included in the location data provided to the mobile computing system can including an address, neighborhood, city, town, and/or municipality associated with the location of the mobile computing device. Additionally, the location data can include information associated with a travel way (e.g., a street, road, or other path) that can be used to determine a point of reference from which an orientation of one or more objects along the travel way can be determined. In some embodiments, the mobile computing device can store one or more portions of the location data locally.

The mobile computing device can generate image data including information associated with the one or more images. For example, the mobile computing device can perform one or more operations to generate the image data based at least in part on the output from one or more sensors associated with one or more image capture devices that were used to capture the one or more images. In some embodiments, image data can be encoded in a variety of ways including being encoded in a raster (e.g., bitmap), voxel, or vector image format. Further, the image data can be based at least in part on video that includes one or more images. For example, the image data can be extracted from a plurality of sequential images of a video. Further, the image data can be generated in a format that can be provided as an input to a machine-learned model.

The mobile computing device can determine, based at least in part on the image data and one or more machine-learned models, one or more object classifications of one or more objects in the environment. For example, the mobile computing device can include one or more machine-learned models that can be configured and/or trained to receive an input including the image data; perform one or more operations on the input including extracting one or more features from the image data; and generate an output including the one or more object classifications of the one or more objects and/or features. For example, the one or more features of a portion of an image depicted in the image data can be classified as a portion of a motor vehicle object including a windshield, door, wheel, or license plate.

In some embodiments, the one or more machine-learned models can be configured and/or trained based at least in part on training data including one or more images of one or more vehicles at one or more distances and one or more angles with respect to an image capture device that captured the one or more images of the one or more vehicles. For example, the training data that is used to configure and/or train the one or more machine-learned models can include one or more images of different vehicles (e.g., different types, makes, and/or models of vehicles) captured from three-hundred and sixty degrees around the vehicle; from different heights including heights that view the vehicle head-on, from above, or from below; at different angles; under different lighting conditions (e.g., the midday sunlight, dawn light, dusk light, moonlight, artificial light (e.g., street lamps, the lights in an indoor parking garage, and/or the lights in a tunnel); and/or with various portions of the vehicle obfuscated or blocked (e.g., a vehicle with features obfuscated by mud or blocked by another vehicle, pedestrian, or tree limb). A more robust machine-learned model may therefore be provided.

In some embodiments, the location of the mobile computing device can be used to determine the one or more machine-learned models that will be used. Further, the location of the mobile computing device can be used to determine that the one or more machine-learned models include at least one machine-learned model that is configured and/or trained based at least in part on training data associated with the geographic region that includes the location of the mobile computing device. For example, each of the one or more machine-learned models can be trained based at least in part on respective training datasets that are associated with a particular geographic region (e.g., different geographic regions in which signage, language, rules of the road, and/or road symbols are different). Further, the mobile computing device can determine and/or select the machine-learned model that is associated with the region that includes the location of the mobile computing device. In some embodiments, the one or more machine-learned models can be trained based at least in part on any combination of a plurality of training datasets that are associated with a plurality of different geographic regions. For example, a single machine-learned model can be trained using training datasets associated with three distinct geographic regions in separate nations. This approach may facilitate improved determination of device orientation by accounting for regional differences which may affect the determination of the orientation of objects in the device's environment In some embodiments, the one or more machine-learned models can be configured and/or trained based at least in part on training data associated with one or more images of one or more different geographic regions. Further, each of the one or more geographic regions can be associated with a respective plurality of traffic regulations. For example, the plurality of traffic regulations can include one or more regulations associated with the side of the street that vehicles can be parked on during certain hours; whether one-way travel, two-way travel, or some other traffic flow pattern is allowed on a travel way; and/or the permissible direction of travel along a portion of a travel way. This approach may facilitate improved determination of device orientation by accounting for geographical differences which may affect the determination of the orientation of objects in the device's environment.

In some embodiments, the one or more objects can include one or more vehicles. For example, the one or more objects depicted in the image data can include one or more motor vehicles including automobiles, buses, trains, trams, trolleys, and/or streetcars.

In some embodiments, the one or more machine-learned models can be configured and/or trained to detect or identify one or more visual features associated with the image data. For example, the one or more machine-learned models can receive input including the image data; perform one or more operations associated with the detection, identification, and/or recognition of one or more visual features of the images depicted in the image data; and generate an output including classification information associated with classification of the one or more visual features of an object. For example, the output can include a determination that the one or more visual features include the tail-lights (e.g., rear lights) of a vehicle, which can then be used to determine the position of the vehicle relative to the device within the environment, and which can then be used to determine the orientation of the mobile device that provided the image data.

In some embodiments, the one or more machine-learned models can be configured and/or trained based at least in part on training data associated with an image corpus that can include a plurality of two-dimensional images of one or more environments captured from a ground-based image capture device. For example, the image corpus can include a plurality of tagged images of various streets. Further, the tagged images can include semantic information associated with the location, name, and address of the streets. Further, the tagged images can include information associated with one or more objects depicted in the tagged images including a geographic location (e.g., latitude, longitude, and/or altitude) of the one or more objects and/or the orientation of each of the one or more objects relative to an image capture device that captured the tagged images.

Training the one or more machine-learned models can include providing a plurality of images of objects in various environments as an input to the one or more machine-learned models. The one or more machine-learned models can then perform one or more operations on the input including extracting one or more features of the input and generating an output including a classification of the objects and/or object features depicted in the images. The output of the one or more machine-learned models can then be evaluated based at least in part on one or more comparisons of the classified objects to the respective ground-truth labels associated with each object. In some embodiments, the output of the one or more machine-learned models can include an estimated distance of the one or more objects from an image capture device that captured the plurality of images, an estimate of a relative orientation of an object relative to an image capture device that captured the plurality of images, and/or an estimate of the size of an object.

Based at least in part on one or more comparisons of the classified objects to the respective ground-truth labels associated with each object, an associated loss can be determined based at least in part on evaluation of a loss function associated with the accuracy of the output generated by the one or more machine-learned models. Further, the one or more machine-learned models can include one or more parameters that can be associated with analysis, processing, determination, generation, and/or extraction of one or more features of an input (e.g., one or more features associated with the image data). One or more parameters of the one or more machine-learned models can then be adjusted based at least in part on the contributions that each of the one or more parameters make with respect to minimization of the loss. As such, the one or more parameters of the one or more machine-learned models can be adjusted over a plurality of iterations, such that the loss is reduced, and the accuracy of object classification by the one or more machine-learned models is improved.

By way of example, the one or more parameters of the one or more machine-learned models that do not change the loss (or do not cause the loss to change by more than a threshold amount) can be kept the same; the one or more parameters that decrease the loss can be weighted more heavily (e.g., adjusted to increase their contribution to the loss); and/or the one or more parameters that increase the loss can have their weighting reduced (e.g., adjusting the value associated with the respective parameter to reduce the parameter's contribution to the loss).

In some embodiments, the one or more machine-learned models can include various types of machine-learned models (e.g., convolutional neural networks, recurrent neural networks, and/or recursive neural networks). Further, the one or more machine-learned models can include different numbers of layers including, for example, a single layer or a plurality of layers.

The mobile computing device can determine, based at least in part on the location data and/or the one or more object classifications of the one or more objects, one or more respective orientations of the one or more objects relative to the location of the mobile computing device. For example, the location data can indicate that the mobile computing device is on a one-way street that is oriented ten degrees east of geographic north. Further, the mobile computing device can determine that the one or more object classifications of an object in the field of view of the mobile computing device are associated with a rear bumper of a motor vehicle that is perpendicular to the one-way street and that a motor vehicle to which the bumper is attached is oriented approximately ten degrees east of geographic north.

In some embodiments, determining the one or more respective orientations of the one or more objects relative to the location of the mobile computing device can include determining, based at least in part on the one or more object classifications, one or more sides of the one or more objects. The one or more sides of the one or more objects can include a front side, a back side, a top side, a bottom side, a left side, and/or a right side. Further, the one or more machine-learned models can be configured and/or trained to determine the one or more sides of an object that are facing an image capture device that captures one or more images of the object.

Further, the mobile computing device can determine the one or more respective orientations of the one or more sides of the one or more objects relative to the mobile computing device. For example, the mobile computing device can determine that a first object facing the mobile computing device is a vehicle and that the back side of the vehicle is directly in front of the mobile computing device. Further, the mobile computing device can determine that a second object facing the mobile computing device is a second vehicle and that the side of the second vehicle is in front of the mobile computing device, perpendicular to the first vehicle, and disposed from right to left across the field of view of the mobile computing device. Additionally, the mobile computing device can determine that the mobile computing device is on the right side of the street. Based on the location data that indicates that the mobile computing device is on a two-way street and the sides of the objects (e.g., the first vehicle, the second vehicle, and the street) that are depicted in the image data, the mobile computing device can determine the orientation of the mobile computing device relative to the one or more objects.

In some embodiments, the one or more sides of the one or more objects can include one or more sides of one or more vehicles (e.g., one or more motor vehicles). For example, the one or more sides of the one or more objects can include the front side of a vehicle, the back or rear side of a motor vehicle, the left side of a motor vehicle, or the right side of a vehicle. Furthermore, the one or more sides of the one or more objects can include the left side of a travel way or the right side of a travel way.

In some embodiments, the one or more object classifications can be associated with one or more vehicles. Further, the one or more object classifications can include one or more headlight classes, one or more taillight classes, one or more front windshield classes, one or more back windshield classes, one or more front grille classes, one or more wheel classes, one or more side window classes, one or more door classes, and/or one or more bumper classes.

As part of determining the one or more respective orientations of the one or more objects, the mobile computing device can determine, based at least in part on the one or more object classifications, when the one or more objects include one or more vehicle lights (e.g., headlights and/or taillights of a vehicle in an illuminated or unilluminated state) associated with one or more objects. Further, the mobile computing device can determine the one or more respective orientations of the one or more vehicle lights relative to the location of the mobile computing device. For example, the one or more machine-learned models can be configured and/or trained to determine, identify, and/or recognize the one or more features associated with one or more vehicle lights associated with one or more vehicles including various one or more vehicle lights in a variety of shapes, colors, and/or light intensity levels. Using vehicle lights in this way can provide an indication of which way a device is pointed and/or which side of a street a device is positioned on, for example, based on which way traffic is flowing in combination with location data. Determination of a geographic orientation of the device within an environment, particularly within an urban environment, may therefore be improved. This may be particularly beneficial at night, when other visual cues indicating orientation may be harder to identify In some embodiments, determining the one or more respective orientations of the one or more objects relative to the location of the mobile computing device can include determining, based at least in part on the one or more object classifications of the one or more objects, a travel path associated with the environment. For example, the one or more machine-learned models can be configured and/or trained to determine, identify, and/or recognize the one or more object classifications associated with a travel path including road markings, curbs, cross-walks, traffic-lights, and/or various features of the travel path itself (e.g., the shapes, colors, and/or textures associated with asphalt, concrete, and/or other road surfaces).

Further, the mobile computing device can determine the orientation of the travel path relative to the mobile computing device. For example, the mobile computing device can use the geometric features and visual features associated with the travel path (e.g., lines associated with the edges of a road) as points of reference with which to determine the orientation of the travel path relative to the mobile device.

In some embodiments, the one or more object classifications associated with the one or more objects can include one or more indications associated with a direction of travel along the travel path. For example, the one or more indications can include signs (e.g., a one-way street sign) and/or surface markings (e.g., an arrow or the words "ONE-WAY" street or "TWO WAY" street painted on a road surface).

In some embodiments, determining the one or more respective orientations of the one or more objects relative to the location of the mobile computing device can include determining, based at least in part on the one or more object classifications of the one or more objects, one or more directions of travel of the one or more objects. The one or more directions of travel can be based at least in part on one or more movements of the one or more objects relative to the location of the mobile device. For example, the one or more machine-learned models can be configured and/or trained to determine the front side of a vehicle and upon detecting an approaching vehicle, determine that the vehicle is travelling forwards towards the mobile computing device.

On a one-way street, the mobile computing device can, in some embodiments, determine the mobile computing device's orientation based at least in part on the vehicle's direction of travel (e.g., if the one-way street heads due south and the front of the vehicle is heading towards the mobile computing device, then the mobile computing device is oriented due north).

On a two-way street, the mobile computing device can first determine a side of the street that the mobile computing device is on. Assuming that the rules of the road require right-hand driving, if the mobile computing device is on the left side of a street and a vehicle is on the opposite side of the street heading northwards with the back of the vehicle visible to the mobile computing device then the mobile computing device is oriented northwards as well.

In some embodiments, determining the one or more respective orientations of the one or more objects relative to the location of the mobile computing device can include determining, based at least in part on the one or more object classifications of the one or more objects, one or more location identifiers associated with the environment. By way of example, the one or more location identifiers can include one or more street numbers that indicate the number of a street including whether the street number is odd or even.

The mobile computing device can then determine the one or more respective orientations of the one or more location identifiers relative to the mobile computing device. For example, the mobile computing device can use the one or more location identifiers to determine the street that the mobile computing device is on and can use the street number and/or whether the street number is odd or even to determine which side of the street the mobile computing device is on. Further, the mobile computing device can use the side of the street that the mobile computing device is on to determine which direction the mobile computing device is oriented in based on whether the one or more street numbers are increasing or decreasing in value.

In some embodiments, the orientation of the mobile computing device can be based at least in part on one or more locations respectively associated with the one or more location identifiers. For example, the one or more location identifiers can include street signs that are located at the intersection of two streets. The location of an intersection that is within the field of view of the mobile computing device can be used to determine a general orientation of the mobile computing device based at least in part on the location of the one or more location identifiers. Further, the orientation of the mobile computing device can be determined based at least in part on the spatial relations (e.g., distances) between the one or more location identifiers and the mobile computing device.

In some embodiments, the one or more location identifiers can include one or more street numbers, one or more street names, and/or one or more signs associated with a geographic location.

In some embodiments, the one or more location identifiers (e.g., street signs with address numbers) can be used to determine what side of a travel path (e.g., a street) the mobile computing device is located on. For example, the one or more machine-learned models can be configured and/or trained to perform text recognition on numbers displayed on street signs. The side of the street a mobile computing device is on can be determined based at least in part on whether the recognized numbers are odd or even (e.g., in some geographic regions odd numbers are consistently on one side of a travel path and even numbers are consistently on the other side of the travel path).

In some embodiments, determining the one or more respective orientations of the one or more objects relative to the location of the mobile computing device can include determining, based at least in part on the one or more features of the one or more objects, an amount of sunlight at one or more portions of the environment (e.g., one or more different portions of the environment). For example, the mobile computing device can analyze the image data in order to determine an amount of sunlight in different portions of an image based at least in part on the brightness and/or intensity of each portion (e.g., pixel) of the image.

Further, the mobile computing device can determine the one or more respective orientations of the one or more objects relative to the mobile computing device based at least in part on the amount of sunlight at the one or more portions of the environment. For example, using an image in which objects on one side of a street is brightly illuminated with sunlight and the other side is less brightly illuminated with sunlight, the position of the sun can be estimated. The position of the sun can then be used as part of determining the orientation of the mobile computing device with respect to the one or more objects in the environment.

In some embodiments, the orientation of the mobile computing device can be based at least in part on a time of day at which the amount of sunlight at one or more portions of the environment are detected. For example, the image data can indicate the position of the sun in the sky, which can be used to partly determine an orientation of the mobile computing device. By way of further example, the amount of sunlight that is detected on various surfaces (e.g., the surface of the ground or a nearby wall of a building) can be used to estimate the relative position of the sun, which can in turn be used to determine the orientation of surface relative to the mobile computing device. Furthermore, the intensity of sunlight that is cast on different surfaces can be used to estimate the relative position of the sun and thereby determine the orientation of the mobile computing device. In some embodiments, the actual position of the sun can be used to determine the one or more respective orientations of the one or more objects.

Further, the orientation of the mobile computing device can be based at least in part on a direction of one or more shadows in the environment. For example, the direction of shadows cast by a stationary object can change depending on the time of day so that shadows on one side of the stationary object at dawn will be on the other side of the object at dusk. Further, the direction of the one or more shadows can be used to estimate the relative position of the sun, which can in turn be used to determine the orientation of the mobile computing device.

In some embodiments, the mobile computing device can use the location of the moon and/or other celestial objects as part of determining the one or more respective orientations of the one or more objects relative to the location of the mobile computing device.

In some embodiments, determining the one or more respective orientations of the one or more objects relative to the location of the mobile computing device can include determining one or more directions of travel of the one or more objects along the travel path. The determination of the one or more directions of travel along the travel path can be based at least in part on the one or more positions of the one or more forward facing portions of the one or more objects relative to the travel path. For example, the one or more machine-learned models can determine that the image data includes a depiction of the front of a vehicle and based on the location of the vehicle along the travel path (e.g., a one-way street) can determine the orientation of the vehicle. The orientation of the vehicle with respect to the mobile computing device can then be used to determine the orientation of the mobile computing device.

The mobile computing device can generate and/or determine orientation data. The orientation data can include a geographic orientation of the mobile computing device. The geographic orientation of the mobile computing device can be based at least in part on the one or more respective (geographic) orientations of the one or more objects (e.g., orientations of relative to the device). For example, the mobile computing device can determine that the rear portion of an object is oriented northwards (e.g., geographic north or magnetic north). Further, the mobile computing device can determine that the one or more object classifications of an object in the field of view of the mobile computing device are associated with a rear bumper of a motor vehicle that is perpendicular to the one-way street and that a motor vehicle to which the bumper is attached is oriented approximately ten degrees east of the northward orientation of the one-way street.

As described herein, orientation can include a position or direction of one or more objects relative to some point of reference which can including the geographic north pole, the magnetic north pole, the geographic south pole, the magnetic south pole, or some object including a device used to determine orientation. Further, the orientation can be expressed in various ways including as a bearing (e.g., one-hundred and ten degrees), a direction (e.g., a cardinal direction of a compass), or as a clock position (e.g., twelve o'clock to indicate north, six o'clock to indicate south, three o'clock to indicate east, and nine o'clock to indicate west).

The orientation data can be sent to, accessed, and/or used by, one or more augmented reality applications that are associated with the mobile computing device. For example, the augmented reality application can be a computing program that is implemented on the mobile computing device. Further, the orientation of the mobile computing device can be used to establish one or more locations of one or more augmented reality objects relative to the mobile computing device. For example, the orientation of the mobile computing device can be used to establish the location of a mobile computing device (e.g., a smartphone) relative to one or more three-dimensional animated characters generated by the augmented reality application. The orientation data may also be used by other mapping or navigational systems, software, and/or applications.

The systems, methods, devices, apparatuses, and tangible non-transitory computer-readable media in the disclosed technology can provide a variety of technical effects and benefits including an improvement in the determination of the orientation of a device. In particular, the disclosed technology may assist a user (e.g. a user of an orientation device) in performing a technical task by means of a continued and/or guided human-machine interaction process in which an orientation of a device is provided to a user, based in part on the user's general location and imagery associated with objects visible in the field of view of an image capture component of the device. Furthermore, the disclosed technology may also provide benefits including improved navigational safety; reduced energy usage and data consumption by the orientation device; and more efficient use of available network resources.

The disclosed technology can improve the effectiveness and safety of navigation by improving determination of device orientation, thereby reducing the occurrence of situations in which a user becomes lost due to lack of awareness of the user's orientation. Providing a user with an accurate orientation can also reduce the chance that a user will travel to an unsafe location because of inaccurate or missing orientation information. For example, accurate orientation information can reduce the occurrence of a user travelling to a hazardous environments (e.g., an area prone to landslides or flash floods) in which their safety might be compromised.

The disclosed technology can also improve the effectiveness with which network resources are used by reducing the amount of data that the user has to access due to improper orientation and the associated rerouting. More effective determination of orientation in geographic regions around the current location of an orientation device allows users to be properly oriented, thereby reducing the need to repeatedly access directions from a remote source (e.g., a navigation server). As such, more effective determination of orientation can result in more effective utilization of network resources.

Furthermore, the disclosed technology can improve the efficiency of resource consumption (e.g., reduced battery usage by an orientation device) by providing an accurate orientation to a user. For example, the orientation device can save battery resources by receiving accurate orientation information and knowing which direction to go, thereby avoiding the battery drain associated with the repeatedly expending computational resources and battery power by retracing steps and/or rerouting.

Accordingly, the disclosed technology can allow the user of an orientation device to more effectively perform the technical task of determining and providing the orientation of a device, especially in areas in which external signals such as navigational satellite signals are limited or blocked (e.g., blocked by high-rise buildings). As a result, users are provided with the specific benefits of improved safety, reduced network bandwidth utilization, and more efficient use of computational and battery resources. Further, any of the specific benefits provided to users can be used to improve the effectiveness of a wide variety of devices and services including orientation devices and/or orientation services in which the orientation of a device is provided or requested. Accordingly, the improvements offered by the disclosed technology can result in tangible benefits to a variety of devices and/or systems including mechanical, electronic, and computing systems associated with navigation and/or the determination of orientation.

With reference now to FIGS. 1-10, example embodiments of the present disclosure will be discussed in further detail. FIG. 1 depicts a diagram of an example system according to example embodiments of the present disclosure. The system 100 includes a computing device 102, a computing system 130, a training computing system 150, and one or more remote computing systems 170 that are communicatively connected and/or coupled over a network 180.

The computing device 102 can include one or more processors 112 and a memory 114. The one or more processors 112 can include any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform one or more operations. In some embodiments, the data 116 can include: location data that can include information associated with the location of the computing device 102; image data associated with one or more images captured by an image capture device or component of the computing device 102; data associated with the input, output, and/or one or more operations of one or more machine-learned models; and/or orientation data associated with the orientation of the computing device 102 and/or one or more objects external to the computing device 102. In some embodiments, the computing device 102 can include any of the attributes and/or capabilities of the computing system 130 and can perform one or more operations including any of the operations performed by the computing system 130.

The computing device 102 can be implemented in and/or include any type of computing device, including, for example, an orientation device (e.g., a computing device configured to perform any operations described herein including one or more operations associated with navigation and/or determination of orientation), a personal computing device (e.g., laptop computing device or desktop computing device), a mobile computing device (e.g., smartphone or tablet), a controller, a wearable computing device (e.g., a smart watch), and/or an embedded computing device.

Further, the computing device 102 can be configured to perform one or more operations including: capturing one or more images of an environment visible in a field of view of a mobile computing device; receiving location data associated with a location of the mobile computing device; generating image data including information associated with the one or more images; determining, based at least in part on the image data and one or more machine-learned models, one or more object classifications of one or more objects in the environment; determining, based at least in part on the location data and the one or more object classifications of the one or more objects, one or more respective orientations of the one or more objects relative to the location of the mobile computing device; and/or generating orientation data including a geographic orientation of the mobile computing device based at least in part on the one or more respective (geographic) orientations of the one or more objects.

In some embodiments, the computing device 102 can perform one or more operations including: sending the orientation data to one or more augmented reality applications associated with the mobile computing device.

In some implementations, the computing device 102 can implement and/or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. Examples of the one or more machine-learned models 120 are discussed with reference to FIGS. 1-10.

In some implementations, the one or more machine-learned models 120 can be received from the computing system 130 (e.g., a server computing system) over network 180, stored in the computing device memory 114, and then used or otherwise implemented by the one or more processors 112. In some implementations, the computing device 102 can implement multiple parallel instances of a single machine-learned model of the one or more machine-learned models 120 (e.g., to determine one or more object classifications of the one or more objects across multiple instances of the machine-learned model 120). More particularly, the one or more machine-learned models 120 can be configured and/or trained to perform any of the operations performed by the computing system 130.

Additionally, or alternatively, one or more machine-learned models 140 can be included in or otherwise stored and implemented by the computing system 130 that communicates with the computing device 102, for example, according to a client-server relationship. For example, the machine-learned models 140 can be implemented by the computing system 130 as a portion of a web service (e.g., a navigation and/or orientation determination service). Thus, one or more machine-learned models 120 can be stored and implemented at the computing device 102 and/or one or more machine-learned models 140 can be stored and implemented at the computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger and/or a stylus). The touch-sensitive component can serve to implement a virtual keyboard. Other example user input components include a microphone, a mechanical keyboard, an electromechanical keyboard, and/or other means by which a user can provide user input.

The computing system 130 can include one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the computing system 130 to perform operations. In some embodiments, the data 136 can include: location data and/or image data.

Furthermore, in some embodiments, the computing system 130 can be configured to perform the operations of a server computing device including sending and/or receiving data including location data, image data, orientation data, and/or data associated with the input, output, and/or one or more operations of one or more machine-learned models to and/or from one or more computing devices and/or computing systems including the computing device 102, the training computing system 150, and/or the remote computing system 170. In some embodiments, the computing system 130 can include any of the attributes and/or capabilities of the computing device 102 and can perform one or more operations including any of the operations performed by the computing device 102.

Further, the computing system 130 can be implemented in and/or include any type of computing system, including, for example, a navigation computing system (e.g., a computing system configured to perform any operations described herein including one or more operations associated with location data, image data, data associated with the input, output, and/or one or more operations of one or more machine-learned models, and/or orientation data), a personal computing device (e.g., laptop computing device or desktop computing device), a mobile computing device (e.g., smartphone or tablet), a server computing system (e.g., a computing system configured to provide data including location data, image data, data associated with the input, output, and/or one or more operations of one or more machine-learned models, and/or orientation data), and/or a controller.

Furthermore, the server computing system 130 can be configured to perform image content analysis on one or more inputs (e.g., image data including one or more images) that are provided to the server computing system 130. For example, the server computing system 130 can receive data, via the network 180. The data can include image data that includes one or more images and/or associated metadata (e.g., the location (e.g., latitude, longitude, and/or latitude) at which the image was captured). The server computing system 130 can then perform various operations, which can include the use of the one or more machine-learned models 140, to determine one or more object classifications of the one or more images. By way of further example, the server computing system 130 can use object recognition techniques to detect one or more objects in an image (e.g., vehicles, portions of vehicles, buildings, travel paths, location identifiers, text, numbers, and/or natural features including sunlight) based at least in part on recognition of the one or more objects. In another example, the server computing system 130 can receive data from one or more remote computing systems (e.g., the one or more remote computing systems 170) which can include images that have been associated with metadata (e.g., images with user associated metadata indicating the address associated with an image that is generated by a user device). The data received by the server computing system 130 can then be stored (e.g., stored in an image repository) for later use by the computing system 130.

In some implementations, the computing system 130 includes and/or is otherwise implemented by one or more server computing devices. In instances in which the computing system 130 includes plural server computing devices, such server computing devices can operate according to sequential computing architectures, parallel computing architectures, or some combination thereof.

As described above, the computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-10.

The computing device 102 and/or the computing system 130 can train the one or more machine-learned models 120 and/or 140 via interaction with the training computing system 150 that is communicatively connected and/or coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include location data, image data, data associated with the input, output, and/or one or more operations of one or more machine-learned models, and/or orientation data. In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include, for example, any location data and/or image data including images of various vehicles; portions of vehicles; road features; signs; and/or road markings. For example, the training data can include one or more labelled training objects that can be used to train the one or more machine-learned models to perform various operations including determining one or more object classifications of one or more objects; determining, identifying, and/or recognizing one or more classes of one or more objects; and/or estimating orientations of objects. The one or more machine-learned models 120 and/or the one or more machine-learned models 140 can be configured and/or trained to perform any of the one or more operations performed by the computing device 102 and/or the computing system 130. For example, the one or more machine-learned models 120 can be configured and/or trained to perform various operations including: capturing one or more images of an environment visible in a field of view of a mobile computing device; receiving location data associated with a location of the mobile computing device; generating image data including information associated with the one or more images; determining, based at least in part on the image data and one or more machine-learned models, one or more object classifications of one or more objects in the environment; determining, based at least in part on the location data and the one or more object classifications of the one or more objects, one or more respective orientations of the one or more objects relative to the location of the mobile computing device; and/or generating orientation data including a geographic orientation of the mobile computing device based at least in part on the one or more respective (geographic) orientations of the one or more objects.

In some implementations, if the user has provided consent, the training examples can be provided by the computing device 102. Thus, in such implementations, the one or more machine-learned models 120 provided to the computing device 102 can be trained by the training computing system 150 based at least in part on user-specific data received from the computing device 102 including: previously classified objects and/or indications that an object was misclassified.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

Each of the one or more remote computing systems 170 can include one or more processors 172 and a memory 174. The one or more processors 172 can include any suitable processing device (e.g., a processor core, a microprocessor, an ASIC, a FPGA, a controller, and/or a microcontroller) and can include one processor or a plurality of processors that are operatively connected. The memory 174 can include one or more non-transitory computer-readable storage mediums, including RAM, ROM, EEPROM, EPROM, flash memory devices, magnetic disks, and combinations thereof. The memory 174 can store data 176 and instructions 178 which are executed by the processor 172 to cause the remote computing system 170 to perform operations.

In some implementations, the one or more remote computing systems 170 include or are otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including location data that can include information associated with the location of the computing device 102; image data associated with one or more images captured by an image capture device or component of the computing device 102; data associated with the input, output, and/or one or more operations of one or more machine-learned models; and/or orientation data associated with the orientation of the computing device 102 and/or one or more objects external to the computing device 102. The one or more remote computing systems 170 can include a smart phone device that a user of the smart phone device can use to access location data, image data, and/or orientation data.

For example, the user of the smartphone device can record location data and/or image data including the latitude, longitude, and/or altitude associated with one or more images that were captured by a user. The information from the smart phone device can then be sent to the one or more remote computing systems 170 which can include a repository that can be used to store network data including user provided orientation data. In some embodiments, the user provided data can be strongly encrypted, anonymized (e.g., any personal information or other information associated with the user's identity is either not collected or is deleted after being received), and maintained in a secure and privacy enhancing way for use by the one or more remote computing systems 170 which can provide the location data and/or image data for use by other computing devices and/or systems including those described herein.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates an example computing system that can be used to implement the present disclosure. Other computing systems can be used as well. For example, in some implementations, the computing device 102 and/or the computing system 130 can include the model trainer 160 and the training data 162. In such implementations, the one or more machine-learned models 120 can be both trained and used locally at the computing device 102 and/or the computing system 130. In some such implementations, the computing device 102 and/or the computing system 130 can implement the model trainer 160 to personalize the one or more machine-learned models 120 based on user-specific data.

Figure 2:
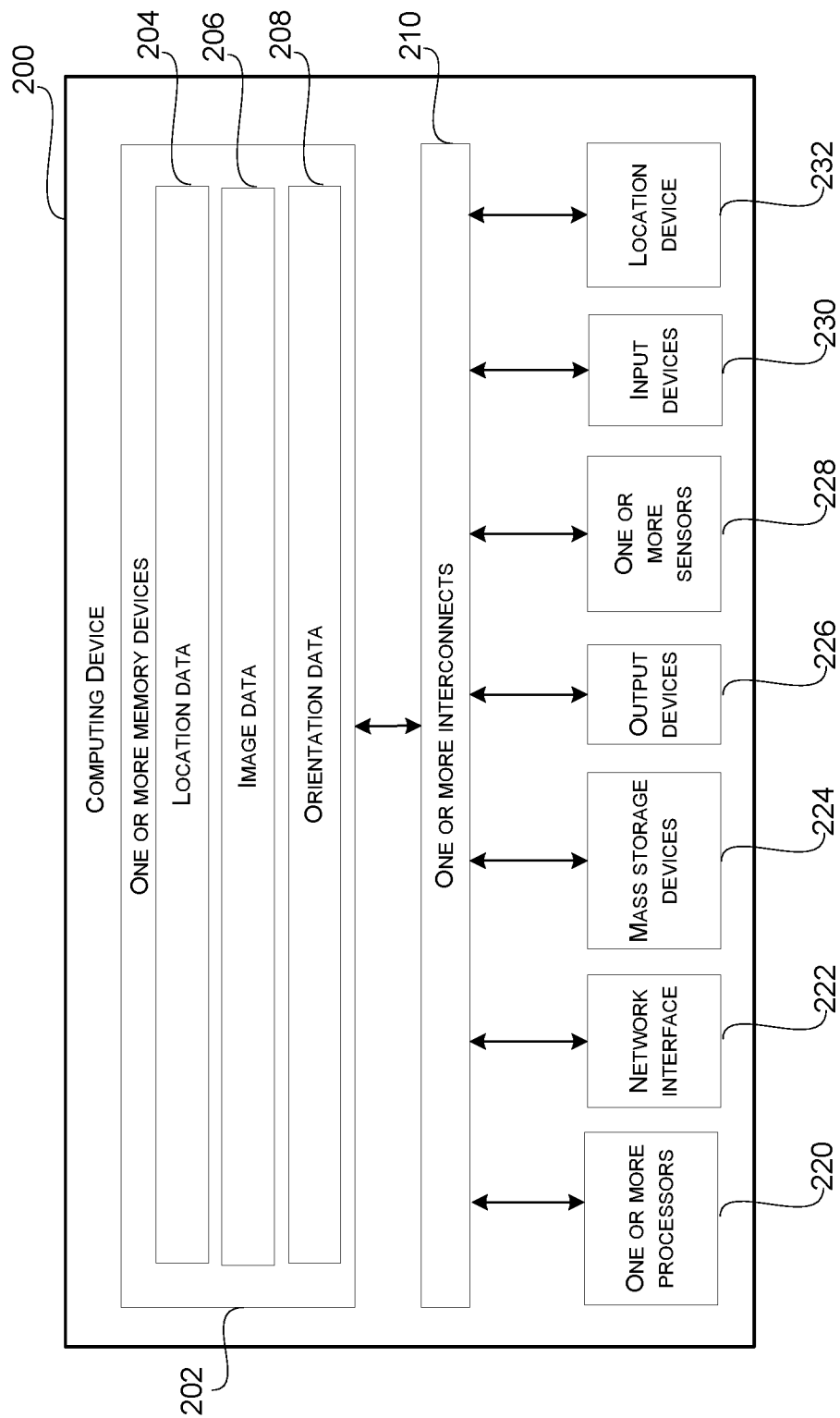
FIG. 2 depicts a diagram of an example device according to example embodiments of the present disclosure.

FIG. 2 depicts a diagram of an example device according to example embodiments of the present disclosure. A computing device 200 can include one or more attributes and/or capabilities of the computing device 102, the computing system 130, the training computing system 150, and/or the one or more remote computing systems 170. Furthermore, the computing device 200 can perform one or more actions and/or operations including the one or more actions and/or operations performed by the computing device 102, the computing system 130, the training computing system 150, and/or the one or more remote computing systems 170, which are depicted in FIG. 1.

As shown in FIG. 2, the computing device 200 can include one or more memory devices 202, location data 204, image data 206, orientation data 208, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the location data 204, the image data 206, and/or the orientation data 208). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The location data 204 can include one or more portions of data (e.g., the data 116, the data 136, the data 156, and/or the data 176 which are depicted in FIG. 1) and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the location data 204 can include information associated with one or more locations including a location of the computing device 200. In some embodiments, the location data 204 can be received from one or more computing systems (e.g., the computing system 130 that is depicted in FIG. 1) and/or one or more navigation satellites (e.g., GPS).

The image data 206 can include one or more portions of the data 116, the data 136, the data 156, and/or the data 176 which are depicted in FIG. 1 and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the image data 206 can include information associated with one or more images of one or more objects in an environment that is visible in the field of view of the computing device 200. In some embodiments, the image data 206 can be received from one or more computing systems (e.g., the computing system 130 that is depicted in FIG. 1).

The orientation data 208 can include one or more portions of the data 116, the data 136, the data 156, and/or the data 176 which are depicted in FIG. 1 and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the orientation data 208 can include information associated with the orientation (e.g., compass direction and/or bearings) of the computing device 200. In some embodiments, the orientation data 208 can be received from one or more computing systems (e.g., the computing system 130 that is depicted in FIG. 1).

The one or more interconnects 210 can include one or more interconnects or buses that can be used to send and/or receive one or more signals (e.g., electronic signals) and/or data (e.g., the location data 204, the image data 206, and/or the orientation data 208) between components of the computing device 200, including the one or more memory devices 202, the one or more processors 220, the network interface 222, the one or more mass storage devices 224, the one or more output devices 226, the one or more sensors 228 (e.g., a sensor array), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the location data 204, the image data 206, and/or the orientation data 208. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the location data 204, the image data 206, and/or the orientation data 208. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras (e.g. to capture images of an environment of the device).

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning system (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associated with the system 100 shown in FIG. 1. Further, the software applications that can be operated and/or executed by the computing device 200 can include native applications and/or web-based applications.

The location device 232 can include one or more devices or circuitry for determining the position of the computing device 200. For example, the location device 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
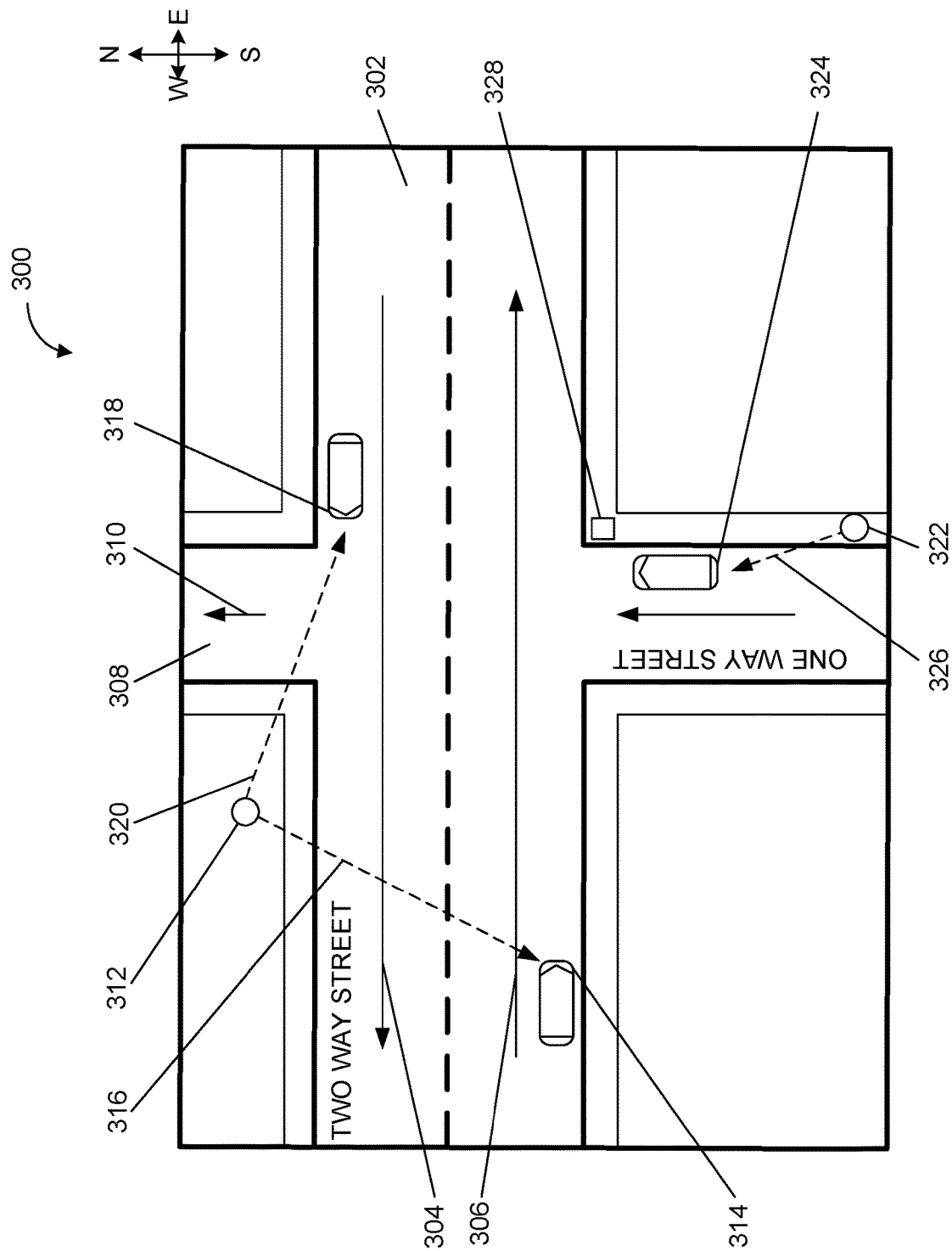
FIG. 3 depicts an example of orientation determination in an environment according to example embodiments of the present disclosure.

FIG. 3 depicts an example of orientation determination in an environment according to example embodiments of the present disclosure. Any operations and/or actions performed in an environment 300 can be performed by a computing device and/or computing system that includes one or more attributes and/or capabilities of the computing device 102, the computing system 130, the training computing system 150, and/or the one or more remote computing systems 170. As shown in FIG. 3, the environment 300 includes a travel path 302, a westward direction of travel 304, an eastward direction of travel 306, a travel path 308, a northward direction of travel 310, a mobile computing device 312, an orientation 314, a vehicle 316, an orientation 318, a vehicle 320, a mobile computing device 322, an orientation 324, a vehicle 326, and a location identifier 328.

The environment 300 can include any geographic region or area. In this example, the environment 300 is an urban area that includes the intersection of the travel path 302 and the travel path 308. The travel path 302 is a two-way road that runs along the westward direction of travel 304 on its northerly side and the eastward direction of travel 306 on its southerly side. The travel path 304 is a one-way road that runs from south to north along the northward direction of travel 310.

The mobile computing device 312 can include any of the attributes and/or capabilities of the mobile computing devices described herein (e.g., the computing device 102 that is depicted in FIG. 1). Further, the mobile computing device can be a portable device that is configured to perform one or more operations including the determination of orientation using a combination of location data and image data as described herein. For example, the mobile computing device 312 can determine the location of the mobile computing device 312 by acquiring location data associated with one or more GPS signals, from which an approximate latitude, longitude, and/or altitude of the mobile computing device 312.

Further, using the location data associated with a location (e.g., an approximate location) of the mobile computing device 312, the mobile computing device 312 can determine that the user is on the sidewalk adjacent to the travel path 302. A user of the mobile computing device 312 can point the mobile computing device 312 towards the front of the vehicle 314 which is located on the southerly side of the travel path 302. The mobile computing device 312 can then determine that the vehicle 314 is on the opposite side of the street and can also use one or more machine-learned models implemented on the mobile computing device 312 to determine that the front of the vehicle 314 is in the field of view of an image capture component of the mobile computing device 312. In some embodiments, multiple images of the vehicle 314 can be used to determine the direction of travel of the vehicle 314 along the travel path 302. For example, a video stream can be used to determine the direction of travel of the vehicle 314 over time.

Based at least in part on the direction of travel of the vehicle 312, the mobile computing device 312 can determine that the orientation of the front of the vehicle 314 relative to the location of the mobile computing device 312 is the orientation 316 which is a roughly south-western orientation with a bearing of approximately two-hundred and twenty (220) degrees from true north.

Furthermore, the user of the mobile computing device 312 can point the mobile computing device 312 towards the front of the vehicle 318, which is located on the northerly side of the travel path 302. The mobile computing device 312 can then determine that the orientation of the front of the vehicle 318 relative to the location of the mobile computing device 312 is the orientation 320 which is a roughly south-eastern orientation with a bearing of approximately one-hundred and ten (110) degrees from true north.

Additionally, a user of the mobile computing device 322 can point the mobile computing device 312 towards the back of the vehicle 324 which is located on the travel path 308. The mobile computing device 322 can then use one or more machine-learned models to determine that the back of the vehicle 324 is in the field of view of an image capture component of the mobile computing device 322. Further, the mobile computing device 322 can determine that the orientation of the back of the vehicle 324 relative to the location of the mobile computing device 322 is the orientation 326 which is a roughly north-western orientation with a bearing of approximately three-hundred and thirty (330) degrees from true north.

In some embodiments, the mobile computing device 312 and/or the mobile computing device 322 can use the location identifier 328 to determine their respective orientations. For example, the location identifier 328 can be a street sign that indicates a name and numbering associated with the travel path 302 and the travel path 308. For example, the location identifier 328 can include two signs, a first sign that is parallel to the travel path 302 that reads "400 EAST STREET" and a second sign that is parallel to the travel path 308 that reads "SOUTH STREET". The mobile computing device 312 and/or the mobile computing device 322 can generate image data based at least in part on the capture of one or more images of the location identifier 328. Further, the image data can be used as an input to the one or more machine-learned models that have been configured and/or trained to recognize text. Based at least in part on recognition of the text on the location identifier 328, the mobile computing device 312 and/or the mobile computing device 322 can determine an orientation of the location identifier 328 relative to the mobile computing device 312 and/or the mobile computing device 322 respectively. For example, from the vantage point of the mobile computing device 312, the field of view of the mobile computing device 312 can capture the two signs of the location identifier 328 at different angles that can be used to determine the location of the location identifier 328 relative to the mobile computing device 312.

Figure 4:
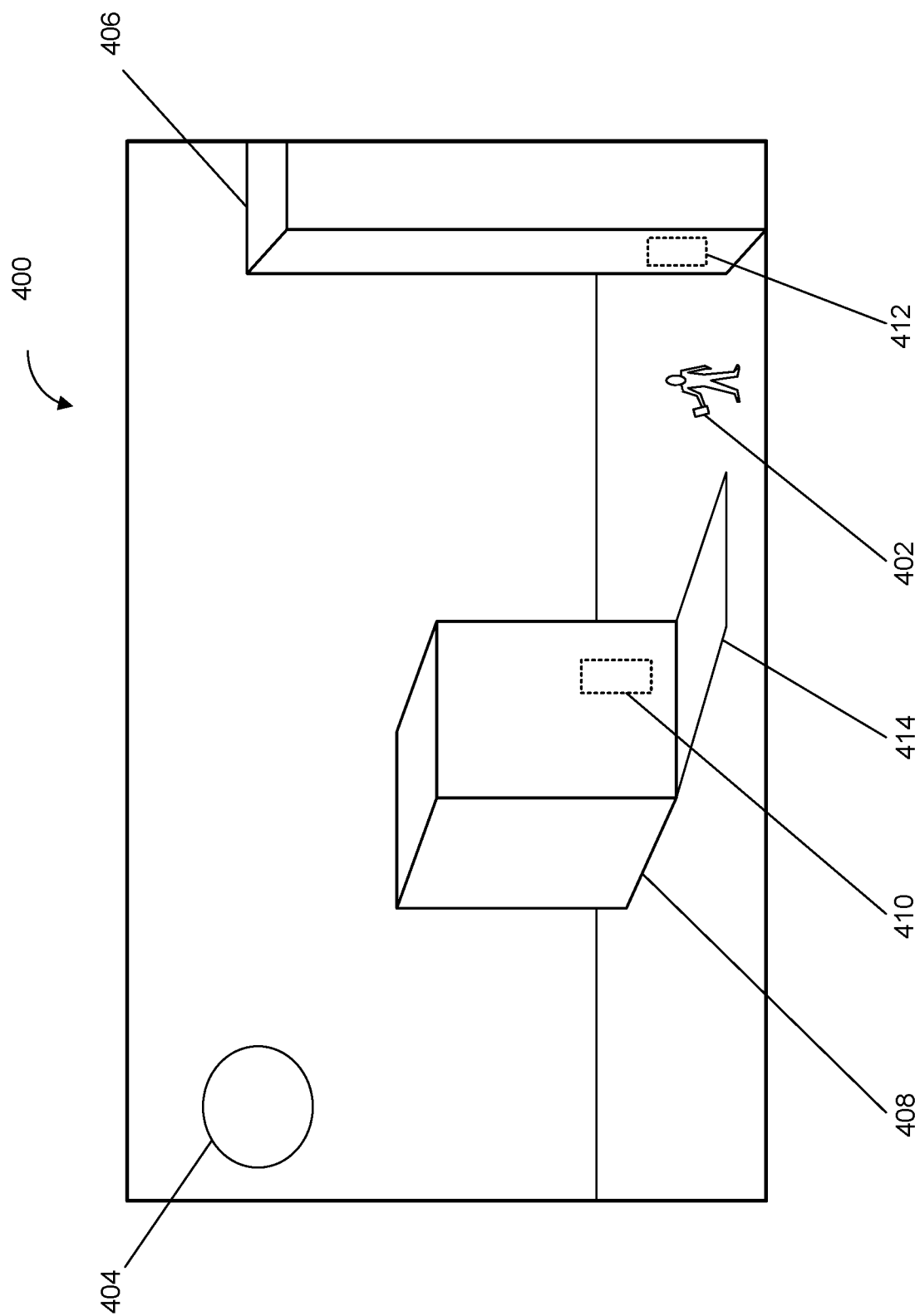
FIG. 4 depicts an example of orientation determination in an environment according to example embodiments of the present disclosure.

FIG. 4 depicts an example of orientation determination in an environment according to example embodiments of the present disclosure. Any operations and/or actions performed in an environment 400 can be performed by a computing device and/or computing system that includes one or more attributes and/or capabilities of the computing device 102, the computing system 130, the training computing system 150, and/or the one or more remote computing systems 170. As shown in FIG. 4, the environment 400 includes a mobile computing device 402, the sun 404, a building 406, a building 408, a region 410, a region 412, and a shadowy region 414.

The environment 400 can include any geographic region or geographic area, for example an urban area that includes the building 404 and the building 406. In this example, the time of day is three o'clock in the afternoon (3:00 p.m.), the sky is free of clouds, and the sun 404 is shining brightly overhead.

The mobile computing device 402 can include any of the attributes and/or capabilities of the mobile computing devices described herein (e.g., the computing device 102 that is depicted in FIG. 1). Further, the mobile computing device 402 can be a portable device that is configured to perform one or more operations including the determination of orientation using a combination of location data and image data as described herein. For example, the mobile computing device 402 can determine the orientation of the mobile computing device 402 based at least in part on image data that can be analyzed to determine an amount of sunlight at one or more portions of the environment 400.

In this example, a user of the mobile computing device 402 is located between the building 406 and the building 408. Due to the height and location of the building 406, the user of the mobile computing device 402 is not able to directly view the sun 404. As part of determining the orientation of the mobile computing device 402, the user can aim an image capture component of the mobile computing device 402 at the region 410 (e.g., a wall) of the building 408 so that the region 410 is within a field of view of the mobile computing device 402. The region 410 is not facing the sun 404, and as a result, the intensity of light (sunlight) on the surface of the region 410 is relatively low. The user of the mobile computing device 402 can also capture image data that includes the shadowy region 414. The mobile computing device 402 can determine the position of the sun based on the intensity of light on the surface of the region 410 and/or the direction of shadows in the shadowy region 414.

In contrast with the region 410, if the user aims the mobile computing device 402 at the region 412 (e.g., a column) of the building 406, the intensity of light (sunlight) will be significant since the region 412 is facing the sun 404 and is not obstructed. Based at least in part on the time of day and the amount of light cast on the region 412, the mobile computing device 402 can determine the position of the sun 404. The position of the sun 404 can then be used in the determination of the orientation of the region 412 relative to the mobile computing device 402. This can facilitate more accurate determination of orientation even in environments where accurate location information, e.g. GPS, may not be available due to interference or blocking from buildings (e.g. such as buildings 406 and 408).

In some embodiments, the mobile computing device 402 can determine a time of day and use the time of day as a factor in determining the relative intensity of sunlight in different portions of the environment. For example, the amount of sunlight reflected by a surface is different at seven o'clock in the evening (7:00 p.m.) compared to eleven o'clock in the morning (11:00 a.m.).

Figure 5:
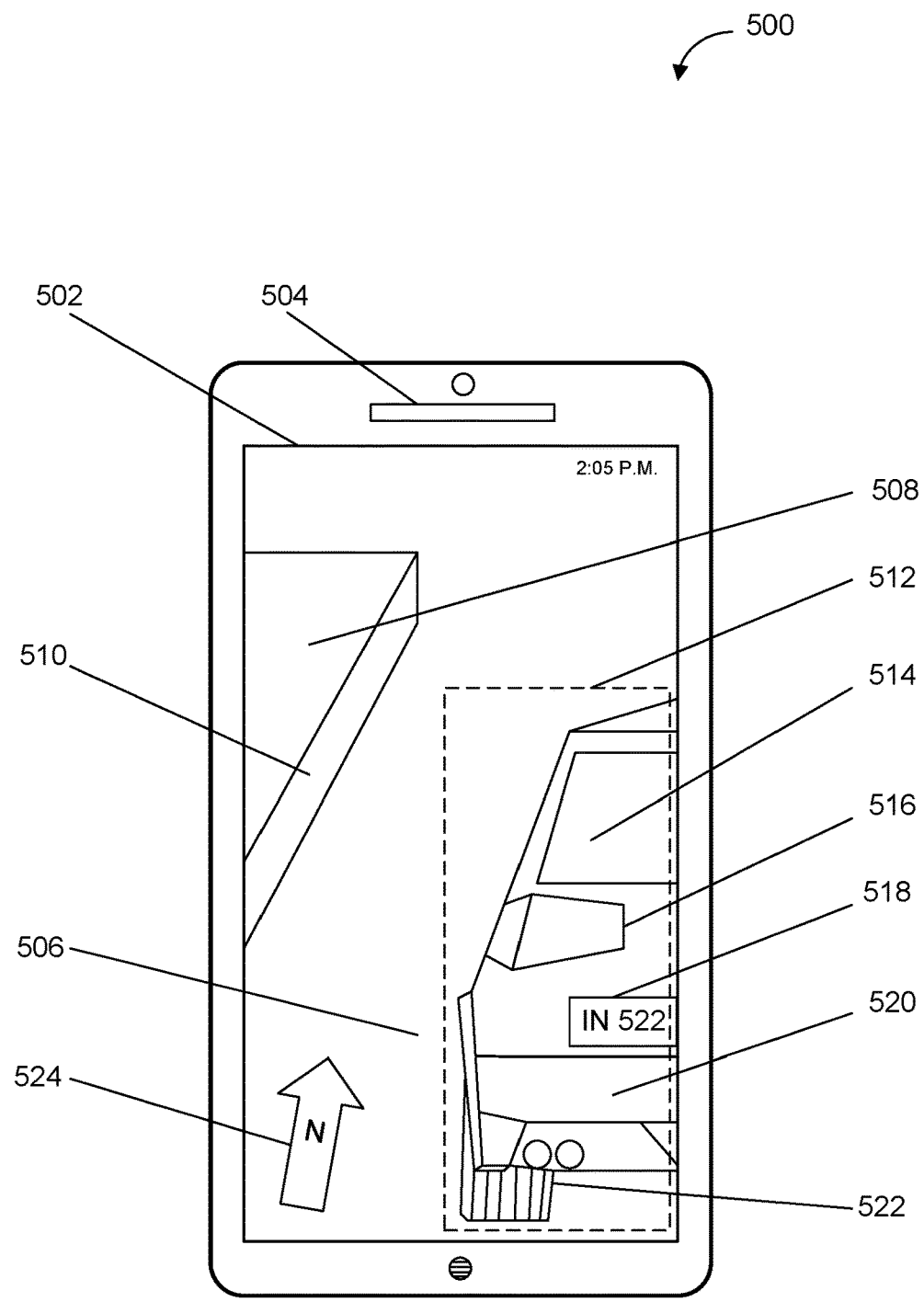
FIG. 5 depicts an example of a device performing orientation determination according to example embodiments of the present disclosure.

FIG. 5 depicts an example of orientation determination in an environment according to example embodiments of the present disclosure. A navigation computing device 500 can include one or more attributes and/or capabilities of the computing device 102, the computing device 200, the computing system 130, the training computing system 150, and/or the one or more remote computing systems 170. Furthermore, the navigation computing device 500 can perform one or more actions and/or operations including the one or more actions and/or operations performed by the computing device 102, the computing system 130, the training computing system 150, and/or the one or more remote computing systems 170, which are depicted in FIG. 1. As shown in FIG. 5, the mobile computing device 500 includes a display component 502, an audio component 504, a travel path object 506, a sidewalk object 508, a curb object 510, a vehicle object 512, a rear windshield object 514, a vehicle light object 516, a license object 518, a rear bumper object 520, a tire object 522, and an orientation indicator 524.

The mobile computing device 500 can be configured to receive data and/or information including location data, image data, and/or any data associated with determining the orientation of the mobile computing device 500 relative to one or more objects in the surrounding environment. For example, the mobile computing device 500 can be implemented as a personal computing device (e.g., a smartphone) or an in-vehicle navigation system that can receive and/or perform operations on location data and/or image data, and which can include one or more machine-learned models that can be configured to detect, identify, and/or recognize one or more objects in the environment. Furthermore, the one or more machine-learned models of the mobile computing device 500 can be configured and/or trained to determine the orientation and/or distance of one or more objects relative to the mobile computing device.

As shown, the mobile computing device 500 includes a display component 502 that can display imagery including text, one or more indications, one or more pictures, and/or one or more graphics. Further, the display component 502 can be configured to detect interactions with the display component 502. For example, the display component 502 can detect interactions using one or more sensors including one or more capacitive sensors, one or more resistive sensors, one or more light sensors, one or more pressure sensors, and/or one or more acoustic sensors. By way of further example, the display component 502 can include a touch sensitive display that can detect one or more touches by a user of the mobile computing device 500.

Further, the mobile computing device 500 can include an audio component 504 that can be configured to output one or more sounds including an auditory indication of the orientation of the mobile computing device 500. For example, the mobile computing device 500 can generate output announcing "THE DEVICE IS POINTING DUE NORTH" to indicate that the mobile computing device 500 is aimed in a northerly direction.

In this example, the mobile computing device 500 includes a camera component (not shown) that has captured an image of a portion of an environment in a field of view of the camera component. The portion of the environment displayed on the display component 502 includes several objects that can be used to determine the orientation of the mobile computing device 500. The mobile computing device 500 can use one or more object classifications extracted from image data associated with the image of the environment displayed on the display component 502 to identify the travel path object 506 (e.g., a city street) in addition to the sidewalk object 508 and the curb object 510 that are adjacent to the travel path object 506. Using location data to determine an approximate location of the mobile computing device 500, the mobile computing device 500 can determine the orientation of the sidewalk object 508 and/or the curb object 510, and thereby determine the orientation of the mobile computing device 500.

Furthermore, the mobile computing device 500 can use one or more object classifications extracted from image data associated with the image of the environment to identify the vehicle object 512. Further, the mobile computing device 500 can determine, identify, and/or recognize one or more portions of the vehicle 512 including the rear windshield object 514, the vehicle light object 516, the license plate object 518, the rear bumper object 520, and/or the tire object 522. The mobile computing device 500 can use the identified portions of the vehicle object 512 to determine an orientation of the vehicle relative to the location of the mobile computing device 500. For example, if the mobile computing device 500 has used location data to determine a street that the mobile computing device 500 is a one-way street, and vehicles on that street are parked in the same direction on one side of that street, then a determination that the rear bumper object 520 is in the field of view of the mobile computing device 500 can be used to determine the orientation of the rear bumper object 520, the vehicle object 512 to which the rear bumper object 520 is attached, and the orientation of the mobile computing device 500.

Furthermore, the mobile computing device 500 can generate the orientation indicator 524 on the display component 502. In this example, the orientation indicator 524 indicates that the imagery depicted in the display component 502 is oriented in a slightly north eastern direction. The orientation indicator 524 can, for example, graphically indicate the orientation by superimposing the orientation indicator 524 over the environment depicted by the display component 502.

Figure 6:
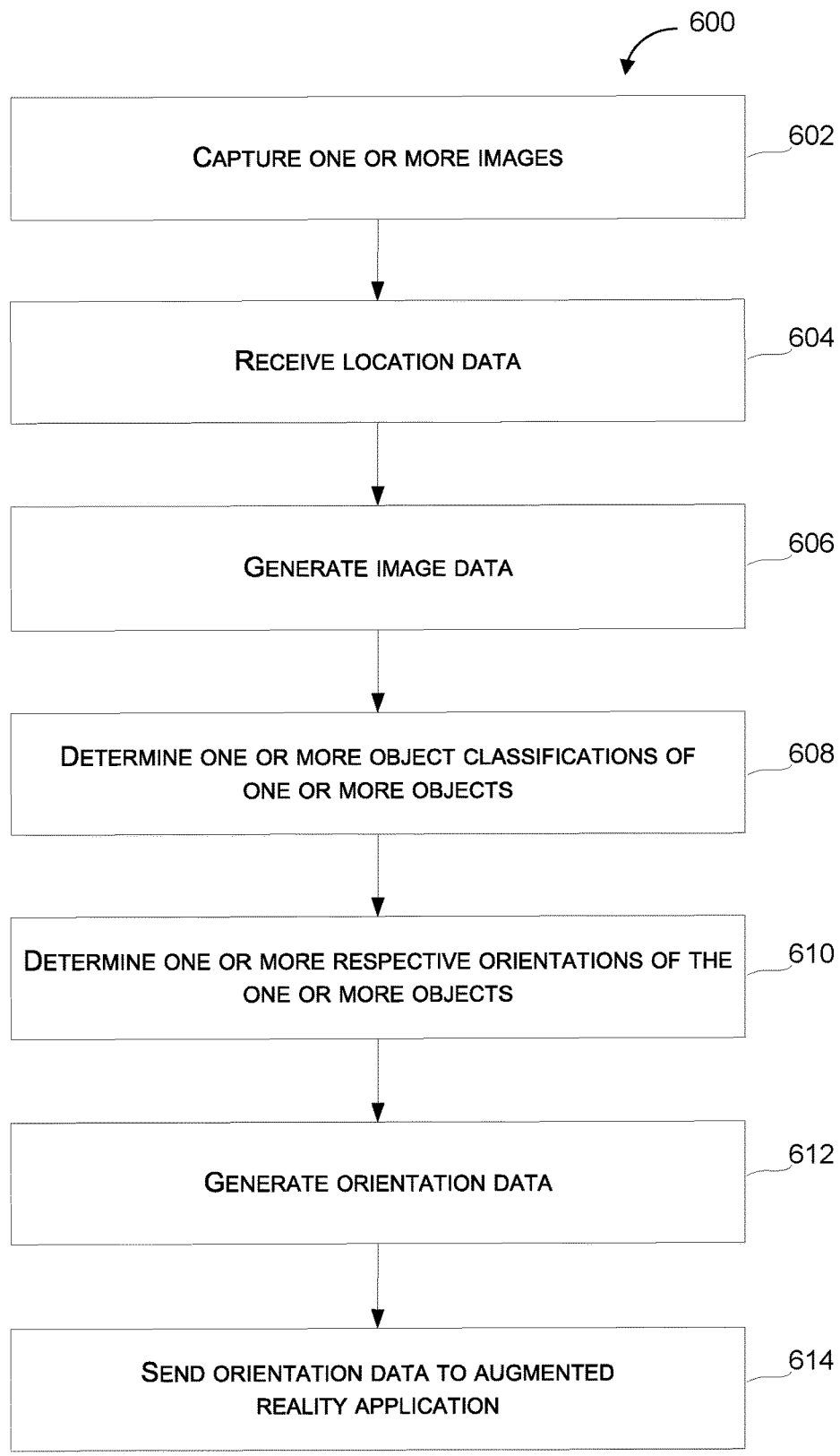
FIG. 6 depicts a flow diagram of orientation determination according to example embodiments of the present disclosure.

FIG. 6 depicts a flow diagram of orientation determination according to example embodiments of the present disclosure. One or more portions of the method 600 can be executed and/or implemented on one or more computing devices or computing systems including, for example, the computing device 102, the computing system 130, the training computing system 150, and/or the remote computing system 170. Further, one or more portions of the method 600 can be executed or implemented as an algorithm on the hardware devices or systems disclosed herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include capturing one or more images (e.g., taking one or more images) which can include capturing one or more images of an environment in which the device (e.g., a mobile computing device) capturing the one or more images is present. The one or more images can include a depiction of an environment visible in a field of view of a device (e.g., a mobile computing device that captures the one or more images). For example, the computing device 102 can include an image capture component (e.g., a camera) that can capture one or more images of the environment.

At 604, the method 600 can include receiving, accessing, obtaining, and/or retrieving location data. The location data can include information associated with a location of the device (e.g., the mobile computing device). For example, the computing device 102 can receive location data based at least in part on and/or including one or more GPS signals indicating the latitude, longitude, and/or altitude of the computing device 102.

At 606, the method 600 can include generating, creating, and/or producing image data. The image data can include information associated with and/or including the one or more images. For example, the computing device 102 can generate the image data based on the one or more images. Further, the image data can be formatted so that it can be provided as input for a machine-learned model. In some embodiments, generating the image data can include performance of one or more operations on the image data including color correction and/or sharpening of the associated one or more images.

At 608, the method 600 can include determining one or more object classifications of one or more objects in the environment. The one or more object classifications can be based at least in part on the image data and/or one or more machine-learned models. For example, the computing device 102 can include the one or more machine-learned models 120 that can be implemented on the computing device 102. Further, the one or more machine-learned models 120 can be configured ad/or trained to determine the one or more object classifications of the one or more objects that are relevant to the determination of orientation. For example, the one or more object classifications can include one or more visual features associated with the shape of vehicle objects including particular portions of vehicles including windows, bumpers (e.g., front bumpers and/or rear bumpers), headlights, tail-lights, windshields, and/or doors.

At 610, the method 600 can include determining one or more respective orientations of the one or more objects relative to the location of the device (e.g., the mobile computing device). The one or more respective orientations of the one or more objects relative to the location of the mobile computing device can be based at least in part on the location data and/or the one or more object classifications of the one or more objects. For example, the computing device 102 can use the location of the computing device 102 and the one or more object classifications of the one or more objects to determine that the back portion of nearby vehicle is directly facing the computing device 102 and that since the vehicle is oriented northwards (the orientation of the vehicle is determined based on matching the street and street direction to the location of the computing device 102), so too is the computing device 102.

At 612, the method 600 can include generating, creating, and/or producing orientation data. The orientation data can include a geographic orientation of the computing device (e.g., the mobile computing device) based at least in part on the one or more respective (geographic) orientations of the one or more objects. The orientation data can include information associated with any aspect of the orientation of the computing device. Further, the orientation data can include information associated with one or more indications that can be generated to provide a user with information and/or instructions about the orientation of one or more objects in the environment within the field of view of the image capture component of the computing device.

By way of example, the computing device 102 can generate orientation data that includes information associated with the orientation of one or more objects that are close to the computing device 102. The computing device 102 can then generate one or more indications including images and/or text associated with the orientation of the one or more objects (e.g., arrows, bounding boxes, and associated orientation indications) that can be displayed on a display component of the computing device 102. By way of further example, the orientation data can be accessed by the computing system 130, which can perform one or more operations on the orientation data and/or send the orientation data to another system and/or device which can include the computing device 102.

At 614, the method 600 can include sending the orientation data to one or more augmented reality applications. The one or more augmented reality applications can be associated with the computing device (e.g., the mobile computing device). Further, the orientation of the mobile computing device can be used to establish one or more locations of one or more augmented reality objects relative to the mobile computing device. For example, the computing device 102 can send data including the orientation data to a locally executed application (e.g., an application running on the computing device 102). The orientation data can provide the orientation of the mobile computing device (e.g., a smartphone, augmented reality glasses, and/or an augmented reality headset) for use by the augmented reality application.

Figure 7:
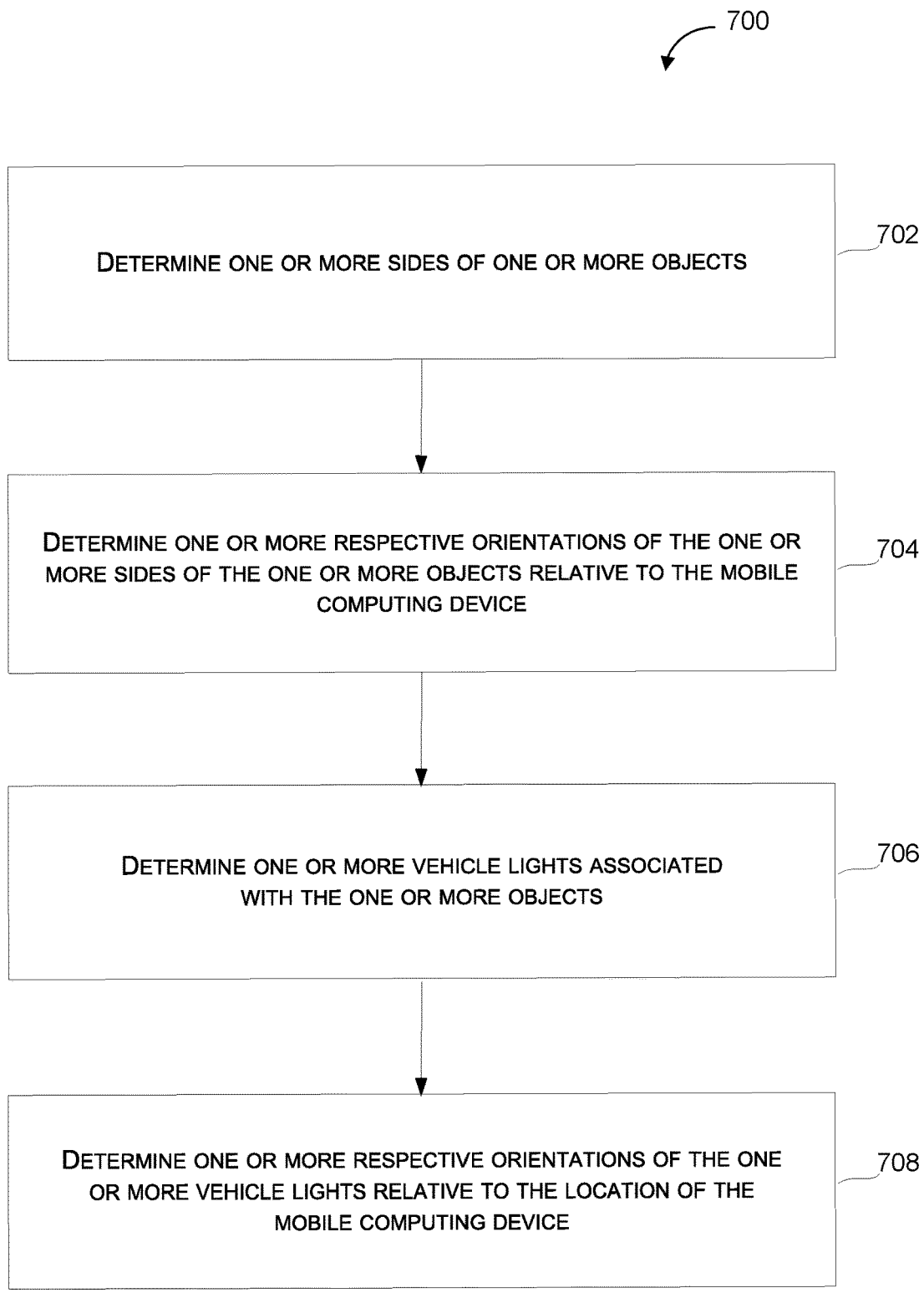
FIG. 7 depicts a flow diagram of orientation determination according to example embodiments of the present disclosure.

FIG. 7 depicts a flow diagram of orientation determination according to example embodiments of the present disclosure. One or more portions of the method 700 can be executed and/or implemented on one or more computing devices or computing systems including, for example, the computing device 102, the computing system 130, the training computing system 150, and/or the remote computing system 170. Further, one or more portions of the method 700 can be executed or implemented as an algorithm on the hardware devices or systems disclosed herein. In some embodiments, one or more portions of the method 700 can be performed as part of the method 600 that is depicted in FIG. 6. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include determining one or more sides of the one or more objects. The one or more sides of the one or more objects can be determined based at least in part on the one or more object classifications of the one or more objects. For example, the computing device 102 can include one or more machine-learned models configured and/or trained to determine one or more sides of various classes of objects. Further, the computing device 102 can receive the one or more classified objects as input and generate an output including one or more sides of the object from the perspective that its image was captured. By way of further example, the grille of from the front portion of a motor vehicle can be determined to be the front side of the respective vehicle.

At 704, the method 700 can include determining the one or more respective orientations of the one or more sides of the one or more objects relative to the computing device (e.g., the mobile computing device). For example, the orientation of an object relative to the computing device 102 can be based at least in part on the location of the computing device 102 and the side of the object that is facing the computing device 102. If for example, the computing device 102 is directly facing the back side of an object then the computing device 102 will be facing the same direction as the front side of that object. If, however, the computing device 102 is directly facing the left side of an object, the computing device 102 will be perpendicular to the direction that the object is facing.

At 706, the method 700 can include determining one or more vehicle lights associated with the one or more objects. The determination of the one or more vehicle lights can be based at least in part on the one or more object classifications of the one or more objects. For example, the computing device 102 can include one or more machine-learned models configured and/or trained to one or more vehicle lights. Further, the one or more machine-learned models of the computing device 102 can receive the image data as input and generate an output including the one or more object classifications including one or more vehicle lights. By way of further example, the one or more machine-learned models can be configured and/or trained to distinguish headlights of a vehicle from lamp lights based on the particular features of headlights (e.g., intensity of light and/or color of light). This may facilitate improved determination of orientation, even in a dark, or nighttime, environment.

At 708, the method 700 can include determining one or more respective orientations of the one or more vehicle lights relative to the location of the computing device (e.g., the mobile computing device). For example, the computing device 102 can determine the orientation of a headlight relative to the computing device 102 based at least in part on the shape of the headlights, which can indicate the orientation (e.g., angle) of the associated vehicle. Further, the shape of the headlights can be useful in instances when darkness has fallen and the available light does not permit the capture of clear images of the environment.

Figure 8:
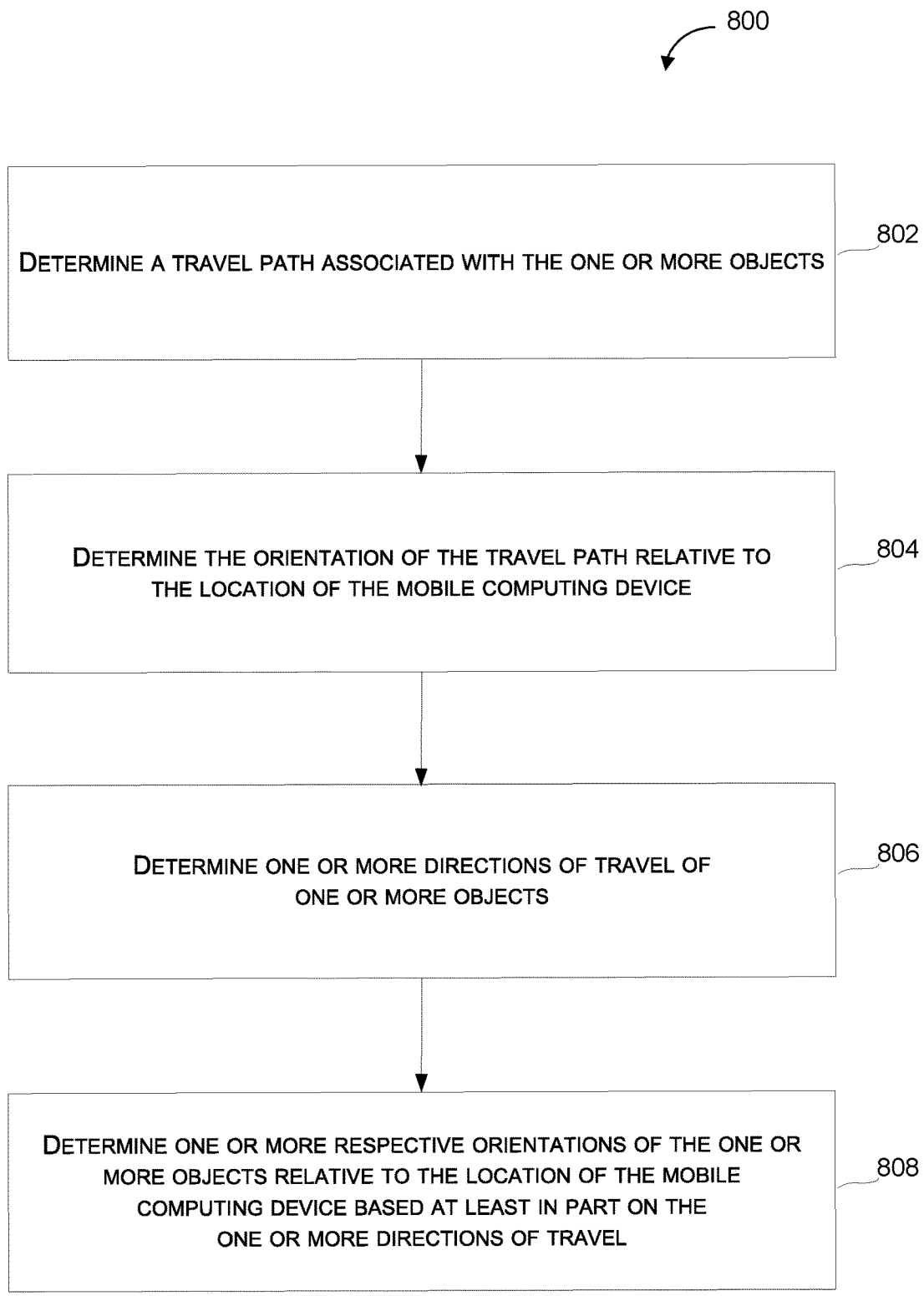
FIG. 8 depicts a flow diagram of orientation determination according to example embodiments of the present disclosure.

FIG. 8 depicts a flow diagram of orientation determination according to example embodiments of the present disclosure. One or more portions of the method 800 can be executed and/or implemented on one or more computing devices or computing systems including, for example, the computing device 102, the computing system 130, the training computing system 150, and/or the remote computing system 170. Further, one or more portions of the method 800 can be executed or implemented as an algorithm on the hardware devices or systems disclosed herein. In some embodiments, one or more portions of the method 800 can be performed as part of the method 600 that is depicted in FIG. 6. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining a travel path associated with the environment. Determination of the travel path can be based at least in part on the one or more object classifications. For example, the computing device 102 can determine, based on the combination of the one or more object classifications, that the one or more object classifications are associated with a road.

At 804, the method 800 can include determining the orientation of the travel path relative to the location of the computing device (e.g., the mobile computing device). For example, the computing device 102 can access the location data to match the travel path with a road that is in the location of the computing device 102. With both the location of the travel path and the computing device 102, the computing device 102 can then determine the orientation of the travel path relative to the location of the computing device 102.

At 806, the method 800 can include determining one or more directions of travel of the one or more objects. Determination of the one or more directions of travel of the one or more objects can be based at least in part on the one or more object classifications of the one or more objects. For example, the computing device 102 can determine the one or more directions of travel based at least in part on the forward sections of the vehicles being oriented (e.g., aimed) in the same direction and the pattern of movement of the vehicles also being in the same direction.

At 808, the method 800 can include determining the one or more orientations of the one or more objects relative to the location of the computing device (e.g., the mobile computing device) based at least in part on the one or more directions of travel of the one or more objects. For example, the computing device 102 can access location data indicating the location of the computing device 102 and can use the location of the computing device 102 to determine the presence of a travel path in the environment visible to the image capture component of the computing device 102. Further, the one or more directions of travel of the one or more objects (e.g., vehicles) can be matched to nearby travel paths. The location of the computing device 102 relative to the direction of travel of an object can then be used to determine the orientation of the computing device 102 relative to the object. This may facilitate improved determination of orientation in an urban or city environment where location information may be inaccurate.

Figure 9:
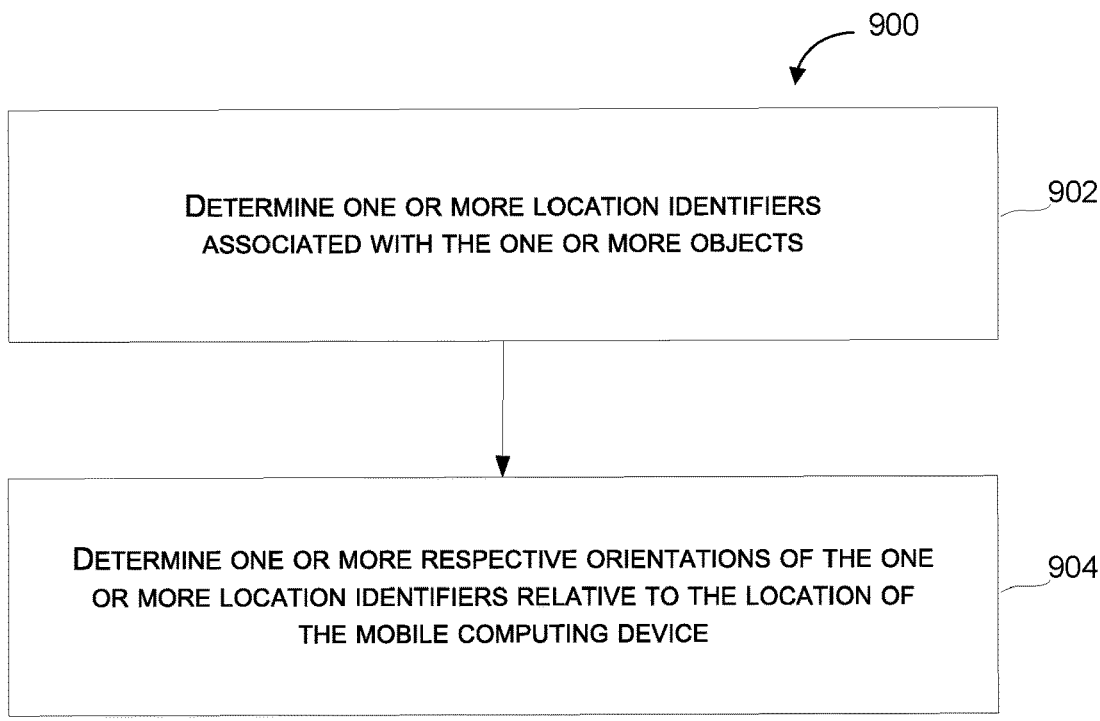
FIG. 9 depicts a flow diagram of orientation determination according to example embodiments of the present disclosure.

FIG. 9 depicts a flow diagram of orientation determination according to example embodiments of the present disclosure. One or more portions of the method 900 can be executed and/or implemented on one or more computing devices or computing systems including, for example, the computing device 102, the computing system 130, the training computing system 150, and/or the remote computing system 170. Further, one or more portions of the method 900 can be executed or implemented as an algorithm on the hardware devices or systems disclosed herein. In some embodiments, one or more portions of the method 900 can be performed as part of the method 600 that is depicted in FIG. 6. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining one or more location identifiers associated with the one or more objects. Determination of the one or more location identifiers can be based at least in part on the one or more object classifications. For example, the computing device 102 can perform one or more text recognition operations on the one or more location indicators including a street sign. Subsequent to performing text recognition on the street sign, the computing device 102 can associate the text on the street sign with an actual address.

At 904, the method 900 can include determining the one or more respective orientations of the one or more location identifiers relative to the computing device (e.g., the mobile computing device). Based on the text recognition of the one or more location identifiers, the computing device 102 can determine the one or more respective orientations of the one or more location identifiers by matching the actual address indicated on the location identifiers with a physical location and then determining the location of the computing device 102 relative to that physical location. Matching the physical location to a location identifier can include accessing a dataset which can include a look-up table that is used to compare the textual name to a corresponding physical location.

Figure 10:
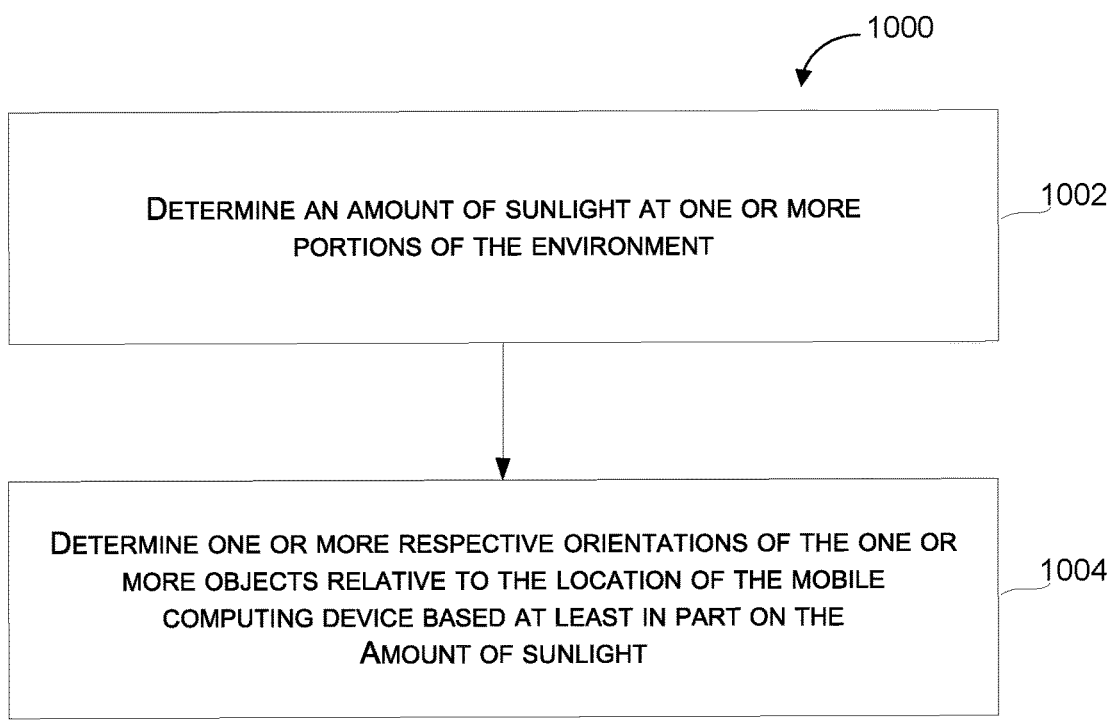
FIG. 10 depicts a flow diagram of orientation determination according to example embodiments of the present disclosure.

FIG. 10 depicts a flow diagram of orientation determination according to example embodiments of the present disclosure. One or more portions of the method 1000 can be executed and/or implemented on one or more computing devices or computing systems including, for example, the computing device 102, the computing system 130, the training computing system 150, and/or the remote computing system 170. Further, one or more portions of the method 1000 can be executed or implemented as an algorithm on the hardware devices or systems disclosed herein. In some embodiments, one or more portions of the method 1000 can be performed as part of the method 600 that is depicted in FIG. 6. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining an amount of sunlight at one or more portions of the environment. Determination of the amount of sunlight at the one or more portions of the environment can be based at least in part on one or more features of the one or more objects. For example, computing device 102 can include a camera that can be used to capture one or more images of the environment. The computing device 102 can then determine one or more features including the amount of light in each pixel of the image by performing one or more image analysis operations on the one or more images. The image analysis can include determining the intensity value or brightness value associated with each pixel of the plurality of pixels in the one or more images.

At 1004, the method 1000 can include determining the one or more respective orientations of the one or more objects relative to the location of the computing device (e.g., the mobile computing device) based at least in part on the amount of sunlight at the one or more portions of the environment. By way of example, the computing device 102 can use the amount of sunlight at the one or more portions of the environment to determine the length and/or direction of shadows near one or more objects in the environment. The shadows can be used to determine the east to west orientation, which can in turn be used to determine the one or more respective orientations of the object that cast the shadow relative to the computing device 102. This may facilitate improved determination of orientation in environments where few identifying objects are present.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining orientation, the computer-implemented method comprising:

capturing, by a mobile computing device comprising one or more processors, one or more images of an environment visible in a field of view of the mobile computing device;

receiving, by the mobile computing device, location data associated with a location of the mobile computing device;

generating, by the mobile computing device, image data comprising information associated with the one or more images;

determining, by the mobile computing device, based at least in part on the image data and one or more machine-learned models, one or more object classifications of one or more objects in the environment, wherein the one or more machine-learned models are customized using user-specific data;

determining, by the mobile computing device, based at least in part on the location data and the one or more object classifications of the one or more objects, one or more respective orientations of the one or more objects relative to the location of the mobile computing device; and generating, by the mobile computing device, orientation data comprising a geographic orientation of the mobile computing device based at least in part on the one or more respective orientations of the one or more objects.

2. The computer-implemented method of claim 1, wherein the determining, by the mobile computing device, based at least in part on the location data and the one or more object classifications of the one or more objects, one or more respective orientations of the one or more objects relative to the location of the mobile computing device comprises:

determining, by the mobile computing device, based at least in part on the one or more object classifications, one or more sides of the one or more objects; and determining, by the mobile computing device, the one or more respective orientations of the one or more sides of the one or more objects relative to the mobile computing device.

3. The computer-implemented method of claim 2, wherein the one or more sides of one or more objects comprise one or more sides of one or more vehicles.

4. The computer-implemented method of claim 1, wherein the one or more object classifications are associated with one or more vehicles, and wherein the one or more object classifications comprise one or more headlight features, one or more taillight features, one or more front windshield features, one or more back windshield features, one or more front grille features, one or more wheel features, one or more side window features, one or more door features, or one or more bumper features.

5. The computer-implemented method of claim 1, wherein the determining, by the mobile computing device, based at least in part on the location data and the one or more object classifications of the one or more objects, one or more respective orientations of the one or more objects relative to the location of the mobile computing device comprises:

determining, by the mobile computing device, based at least in part on the one or more object classifications, one or more vehicle lights associated with the one or more objects; and determining, by the mobile computing device, one or more respective orientations of the one or more vehicle lights relative to the location of the mobile computing device.

6. The computer-implemented method of claim 1, wherein the determining, by the mobile computing device, based at least in part on the location data and the one or more object classifications of the one or more objects, one or more respective orientations of the one or more objects relative to the location of the mobile computing device comprises:
   determining, by the mobile computing device, based at least in part on the one or more object classifications, a travel path associated with the environment; and
   determining, by the mobile computing device, the orientation of the travel path relative to the location of the mobile computing device.

7. The computer-implemented method of claim 6, wherein the one or more object classifications comprise one or more indications associated with a direction of travel along the travel path.

8. The computer-implemented method of claim 1, wherein the determining, by the mobile computing device, based at least in part on the location data and the one or more object classifications of the one or more objects, one or more respective orientations of the one or more objects relative to the location of the mobile computing device comprises:
   determining, by the mobile computing device, based at least in part on the one or more object classifications, one or more directions of travel of the one or more objects; and
   determining, by the mobile computing device, the one or more orientations of the one or more objects relative to the location of the mobile computing device based at least in part on the one or more directions of travel of the one or more objects.

9. The computer-implemented method of claim 1, wherein the determining, by the mobile computing device, based at least in part on the location data and the one or more object classifications of the one or more objects, one or more respective orientations of the one or more objects relative to the location of the mobile computing device comprises:
   determining, by the mobile computing device, based at least in part on the one or more object classifications, one or more location identifiers associated with the one or more objects; and
   determining, by the mobile computing device, the one or more respective orientations of the one or more location identifiers relative to the mobile computing device.

10. The computer-implemented method of claim 9, wherein the orientation of the mobile computing device is based at least in part on one or more locations respectively associated with the one or more location identifiers.

11. The computer-implemented method of claim 9, wherein the one or more location identifiers comprise one or more street numbers, one or more street names, or one or more signs associated with a geographic location.

12. The computer-implemented method of claim 1, wherein the determining, by the mobile computing device, based at least in part on the location data and the one or more object classifications of the one or more objects, one or more respective orientations of the one or more objects relative to the location of the mobile computing device comprises:
   determining, by the mobile computing device, based at least in part on one or more features of the one or more objects, an amount of sunlight at one or more portions of the environment; and
   determining, by the mobile computing device, the one or more respective orientations of the one or more objects relative to the location of the mobile computing device based at least in part on the amount of sunlight at the one or more portions of the environment.

13. The computer-implemented method of claim 12, wherein the one or more respective orientations of the one or more objects relative to the location of the mobile computing device are based at least in part on a time of day at which the amount of sunlight at the one or more portions of the environment was detected.

14. The computer-implemented method of claim 1, wherein the one or more machine-learned models are trained based at least in part on training data comprising one or more images of one or more vehicles at one or more distances and one or more angles with respect to an image capture device that captured the one or more images of the one or more vehicles.

15. One or more tangible non-transitory computer-readable media storing computer-readable instructions that when executed by one or more processors cause the one or more processors to perform operations, the operations comprising:
   capturing one or more images of an environment visible in a field of view of a mobile computing device;
   receiving location data associated with a location of the mobile computing device;
   generating, by the mobile computing device, image data comprising information associated with the one or more images;
   determining, based at least in part on the image data and one or more machine-learned models, one or more object classifications of one or more objects in the environment, wherein the one or more machine-learned models are customized using user-specific data;
   determining, based at least in part on the location data and the one or more object classifications of the one or more objects, one or more respective orientations of the one or more objects relative to the location of the mobile computing device; and
   generating orientation data comprising a geographic orientation of the mobile computing device based at least in part on the one or more respective orientations of the one or more objects.

16. The one or more tangible non-transitory computer-readable media of claim 15, further comprising:
   sending the orientation data to one or more augmented reality applications associated with the mobile computing device, wherein the orientation of the mobile computing device is used to establish one or more locations of one or more augmented reality objects relative to the mobile computing device.

17. The one or more tangible non-transitory computer-readable media of claim 15, wherein the one or more machine-learned models are trained based at least in part on training data associated with one or more images of one or more different geographic regions, and wherein each of the one or more geographic regions is associated with a respective plurality of traffic regulations.

18. A mobile computing device comprising:
   one or more processors;
   one or more non-transitory computer-readable media storing instructions that when executed by the one or more processors cause the one or more processors to perform operations comprising:
      capturing one or more images of an environment visible in a field of view of the mobile computing device;

receiving location data associated with a location of the mobile computing device;

generating image data comprising information associated with the one or more images;

determining, based at least in part on the image data and one or more machine-learned models, one or more object classifications of one or more objects in the environment wherein the one or more machine-learned models are customized using user-specific data;

determining, based at least in part on the location data and the one or more object classifications of the one or more objects, one or more respective orientations of the one or more objects relative to the location of the mobile computing device; and generating orientation data comprising a geographic orientation of the mobile computing device based at least in part on the one or more respective orientations of the one or more objects.

19. The mobile computing device of claim 18, wherein the one or more objects comprise one or more vehicles.

20. The mobile computing device claim 18, wherein the one or more machine-learned models are configured to identify one or more visual features associated with the image data.

* * * * *